US009672283B2

(12) United States Patent
Pappas et al.

(10) Patent No.: US 9,672,283 B2
(45) Date of Patent: Jun. 6, 2017

(54) STRUCTURED AND SOCIAL DATA AGGREGATOR

(71) Applicants: Derek Edwin Pappas, Palo Alto, CA (US); Milos Milosevic, Sombor (RS)

(72) Inventors: Derek Edwin Pappas, Palo Alto, CA (US); Milos Milosevic, Sombor (RS)

(73) Assignee: Data Record Science, Cheyenne, WY (US)

( * ) Notice: Subject to any disclaimer, the term of this patent is extended or adjusted under 35 U.S.C. 154(b) by 475 days.

(21) Appl. No.: 13/911,056

(22) Filed: Jun. 5, 2013

(65) Prior Publication Data

US 2013/0332460 A1 Dec. 12, 2013

Related U.S. Application Data

(60) Provisional application No. 61/656,502, filed on Jun. 6, 2012.

(51) Int. Cl.
*G06F 17/00* (2006.01)
*G06F 17/30* (2006.01)

(52) U.S. Cl.
CPC .. G06F 17/30864 (2013.01); G06F 17/30705 (2013.01); *G06F 17/3061* (2013.01); *G06F 17/30595* (2013.01); *G06F 17/30707* (2013.01)

(58) Field of Classification Search
CPC .......... G06F 17/3053; G06F 17/30864; G06F 17/30867; G06F 17/30386; G06F 17/30528; G06F 17/3064; G06F 17/30705; G06F 17/30828; G06F 17/3089; G06F 17/30979; G06F 17/2785; G06F 17/3002; G06F 17/30315; G06F 17/30522; G06F 17/30551; G06F 17/30722; G06F 17/30849; G06F 17/30861; G06F 17/30873; G06F 17/3097
USPC ........................................................ 707/740
See application file for complete search history.

(56) References Cited

U.S. PATENT DOCUMENTS

| | | | |
|---|---|---|---|
| 6,446,035 B1 * | 9/2002 | Grefenstette et al. | 704/1 |
| 8,639,632 B2 * | 1/2014 | Zurada | G06Q 30/02 705/319 |
| 2011/0099486 A1 * | 4/2011 | Nesladek et al. | 715/753 |
| 2011/0251973 A1 * | 10/2011 | Chen et al. | 705/347 |

(Continued)

*Primary Examiner* — Shahid Alam
*Assistant Examiner* — Andalib Lodhi

(57) ABSTRACT

Information is obtained from the Internet is combined with processed and rated information from social networking services by a structured and social data aggregator providing highly relevant search results. In accordance with an embodiment of the present invention, there is provided a product information crawler, which crawls the Internet in search of web pages relevant to a requested subject or product. The product information crawler conveys captured web pages to a structured data extractor, which extracts product information. A social networking crawler crawls social networking services in search of social network information to the requested subject or product. The processed product information and processed social network information is conveyed to an information aggregator, which merges the information and stores it in a data store that can be queried by a user. A user would then be able conduct a single search about a subject or product, and retrieve highly relevant structured product information enhanced by social networking information.

29 Claims, 20 Drawing Sheets

(56) References Cited

U.S. PATENT DOCUMENTS

| | | | |
|---|---|---|---|
| 2012/0215871 A1* | 8/2012 | Zhang | G06Q 30/0269 709/206 |
| 2012/0246029 A1* | 9/2012 | Ventrone | 705/26.63 |
| 2013/0103667 A1* | 4/2013 | Minh | G06F 17/30864 707/709 |
| 2013/0311875 A1* | 11/2013 | Pappas | G06F 17/2247 715/234 |

* cited by examiner

901

DragonEyeGirl: @MollieGACSWAT Androids Are Cool! I Got My Samsung Galaxy S3 2 Days After It Was Released & I Love It!

Positive

902

DragonEyeGirl: @MollieGACSWAT Androids Are Cool! I Got My Samsung Galaxy S3 2 Days After It Was Released & I Love It!

Purchased Satisfied

STRUCTURED AND SOCIAL DATA AGGREGATOR

CROSS-REFERENCE TO RELATED APPLICATIONS

The present application claims the benefit of U.S. Provisional Application No. 61/656,502, filed Jun. 6, 2012, by Derek Edwin Pappas and titled "Structured and Social Data Aggregator", incorporated by reference herein and for which benefit of the priority date is hereby claimed.

FEDERALLY SPONSORED RESEARCH

Not applicable.

SEQUENCE LISTING OR PROGRAM

Not applicable.

FIELD OF INVENTION

The present invention relates generally to data processing, and more particularly to internet data search, information extraction technologies and social networks.

BACKGROUND OF THE INVENTION

The Internet is a public, self-sustaining, worldwide system of computer networks. The most widely used part of the Internet is the World Wide Web, often referred to as just "the web". The web is an Internet service that organizes information through the use of hypermedia, utilizing markup languages such as Hyper Text Markup Language (HTML) and Extensible Markup Language (XML).

In this context, an HTML file is a file that contains the source code for a particular web page. A web page is the image or collection of images that is displayed to a user when a particular HTML file is rendered by a browser application program. Unless specifically stated, an electronic or web document may refer to either the source code for a particular web page or the web page itself. Each page can contain embedded references to images, audio, video or other web documents. The most common type of reference used to identify and locate resources on the Internet is the Uniform Resource Locator, or URL. In the context of the web, a user, using a web browser, browses for information by following references that are embedded in each of the documents. The Hyper-Text Transfer Protocol ("HTTP") is the protocol used to access a web document and the references that are based on HTTP are referred to as hyperlinks (formerly, "hypertext links").

Many manufacturers (also referred to as brands) and retailers (also referred to as stores) of products post product information on web pages. Product information may be coded manually into web pages or populated automatically from a back-end data store through the use of templates in a Content Management System (CMS).

Search Engines.

It is estimated that the publicly indexable web provides access to over 11.5 billion pages of information. However, a significant drawback with using the web is that because there is so little organization to the web, it can be extremely difficult for users to locate the particular pages that contain the information that is of interest to them. To address this problem, a mechanism known as a "search engine" has been developed to index a large number of web pages and to provide an interface that can be used to search the indexed information by entering certain words or phrases to be queried. These search terms are often referred to as "keywords".

Search engines, such as Google and Bing, generally employ a "crawler" (also referred to as "web crawler", "spider", "robot") to "crawl" across the Internet in a methodical and automated manner to locate web documents. Upon locating a document, the crawler stores the document's URL, and follows any hyperlinks associated with the document to locate other web documents. The search engines generally extract and index certain information about the documents that were located by the crawler. In general, index information is generated based on the contents of the HTML file associated with the document. The search stores the index information in large data stores that is made available for users to query through a user interface. For example, the search engine interface allows users to specify their search criteria pertaining to certain product information (e.g., keywords) and, after performing a search, the search engine provides interface for displaying the search results.

Since search engines are optimized for general search queries, it can be difficult for users to extract product information. Search engines do not provide structured data, search by category or specification attributes is not supported, results tend to be skewed to popular items, and the search engine generally returns URLs to web pages wherein the product information is not displayed uniformly.

Shopping search engines, such as Nextag and Froogle, are search services that attempt to address some of the deficiencies of search engines in locating product information. While these services do have some capability to search by category or specification attributes, these services may not include all relevant websites in their index and may be restricted in the degrees to which the specification attributes may be refined, resulting in incomplete results.

Social Networking Services.

A social networking service is an online service, platform, or site that focuses on building and reflecting of social networks or social relations among people, who, for example, share interests and/or activities. Social network services, such as Facebook and Twitter, essentially consist of a representation of each user (often a profile), the user's social links, and a variety of additional services. Most social network services are web based and provide means for users to interact over the Internet, such as e-mail and instant messaging, in site messages displayed on user's home pages, location based messages, and multimedia sharing such as photos and videos. Social networking sites allow users to share ideas, activities, events, and interests within their individual networks.

Many users of social networking services express their opinions about products through the services, including complaints about products, positive experiences with products, and problems encountered with products. Depending on the status of an expressing user, their particular opinion may carry more or less significance to other users of the social networking service.

Many social networking services are not part of the publicly indexable web. As a result, users seeking information contained within the social networking service need to utilize the search capabilities of the social networking service. For example, social networking services generally provide an interface which allows users to specify their search criteria pertaining to certain product information (e.g., keywords) and, after performing a search, the social networking service provides an interface for displaying the search results which may contain other user's opinions and experiences related to the product information.

Since social networking services are optimized for general search queries, it can be difficult for users to extract organized information pertaining to product information. The social networking service does not organize the information, rate opinions, evaluate sentiment, discern experts, or relate any of the information to structured data.

As a result, in order to obtain structured product information enhanced with social networking information from users and experts in order to make an informed purchasing decision, currently a user would have to perform multiple searches on existing search engines, and then perform multiple searches on social networking services, and then somehow combine the results of those multiple searches in some meaningful way. What is needed is an effective way to extract and combine structured data from websites with relevant data from social networking services along with an interface so that a user can perform a single query to obtain highly relevant information. Some conventional search engines work as voting machines that gather links and calculate the relative popularity of the links and return answers to user queries based on the popularity of the links. The user queries are answered with pages of links which the user can spend a lot of time to sort through manually. Some other conventional search engines extract information and build aggregated data stores that are not complete and contain many errors.

An advantage of the present invention is the improved quality of search results. The structured and social data aggregator returns pre-organized and relevant information that is organized and sorted by specification attributes that contains quantitative data and qualitative data. The conventional search technologies, in contrast, typically return a list of web addresses that may or may not contain relevant search information. The results are often inaccurate, incomplete, or biased by paid inclusion.

Another advantage of the present invention is the automatic creation of the data store encompassing a plurality of web sites and social networking services. The present invention provides a novel method of providing aggregated data by extracting structured data from web pages by crawling, finding, extracting, normalizing and classifying content from web pages, rating social networking information from social networking services by crawling, finding, extracting, rating and classifying content from social networking services, and merging both sets of data in a data store. The disclosed structured and social data aggregator provides a more efficient extraction and rating process, and provides a more comprehensive and accurate aggregated data store.

Another advantage of the present invention is that user generated templates are automatically converted to extraction templates which can be used to extract data records from product pages.

Another advantage of the present invention is the automatic identification of popular products, deals, and social sentiment about products. The system crawls a social site or uses a data feed to find messages containing products, brands, and stores on a social site. The system can then identify links in those messages, follow the links, and identify product pages that information can be extracted from using the templates described above.

Crawling other social networks can be done in several ways. The system can perform a conventional crawl and start at the root of the site. The crawler can use a list of popular users to seed a crawl that extracts the list of followers and then repeats the process of finding the next set of followers. Then each user's social messages are downloaded and analyzed to find content which can be classified. The analyzers identify social messages that contain names of brands, products, stores, model numbers of products, and other brand and store identification information.

Social messages may be re-tweeted on Twitter, re-pined on Pinterest, and shared on Facebook. Many users may have the same social message about the same brand, product, or store on their newsfeed, wall, and/or board. Messages can be cross-posted to other social networks. Identifying the group of people who have the same social message about the same brand, store or product, reveals a common interest, opinion, or thought about the brand, product, or store that we will call a single social message interest cluster. When two or more users appear in more than one interest cluster then the users share the same or similar common interests, opinions, or thoughts about the brand(s), product(s), or store(s) that we will call a multiple social message interest cluster. The walls or newsfeeds belonging to the users in the cluster wall contain the same social message that is identified as a positive or negative opinion, interest, or thought about some social, consumer or rich attribute with respect to the brand, product, or store. And not just a general positive or negative comment as most social message analysis sites have about social messages. The third cluster type is the union of two or more social message interest clusters that share the same people and either the same brand, store, or product but which also have different people. The fourth type of cluster is the union of two or more social message interest clusters that share the same opinions about and have the same brand, store, or product but which also have different people. The fifth type of cluster is the union of two or more social message interest clusters that share the same opinions about and have the different brand, store, or product but which also have different people. The sixth type of cluster can be formed using product categories, where social messages about brands, products, or stores that belong to the same product category, can be clustered. Different category clusters are joined by user interests to form related clusters. Therefore user opinions, interest, and thoughts are used to join clusters. Users, which do not appear in all joined clusters, can be inferred to share similar interests with the users that are in all clusters. If user A is in clusters 1 and 2 and user B is in cluster 1 and user C is in cluster 2 then it can be inferred that users A and C have similar interests even though they do not appear in the same cluster.

Inference of relationships and similar interests between users with the same fine grained social opinions, thoughts, and interests can be weighted by the distance between the users and the number of shared social opinions, thoughts, and interests. Two or more users can express the same social opinion, thought, and/or interest using synonyms. Social opinions, thoughts, and/or interests about brands, products, and stores can be interpreted at a general level (i.e. overall positive or negative) or can be interpreted at a fine grained level with respect to some particular aspect about the brand, store, and/or product.

The social discovery of brands, stores, and products identifies the ones that are the most popular, useful, best, most interesting, for consumers. One embodiment of the present invention finds the brands, products, and stores that consumers like the most and then extracts the product information from the pages that the products are found on.

Newer social sites such as Polyvore, Wanelo, and Pinterest are image driven. The social messages on these sites may not contain any meta-information about the brand, product, store, and/or related rich attributes. The social message also may not contain the link back to the original source. If there is a product link, one embodiment of the present invention can extract the product information. If there is an image, then one embodiment of the present invention can attempt to match the image to an image associated with a product in the data store using well-known image matching techniques. Brand, store, advertiser, publisher, and social sites can modify images from their original form. Some of the image modifications include cropping, scaling, conversion from color to greyscale, conversion from one image format to another image format (e.g. jpg to png conversion), and adding watermarks for copyright protection and other reasons. This is not a comprehensive list of the modifications that can be made to images. Images without meta-information are less valuable to advertisers, brand managers, and other product related professionals and services. Images without meta-information but which contain social comments about brands, products, or stores are more valuable when the images are matched to a brand, product, and/or store data record in the data store. The social messages in the product record can be used to rate the product. Messages may contain opinions, thoughts and/or interest levels. The messages can be used to compare the brand, product, and/or store in the image to social messages about other brands, products, and/or stores. The image can be used to normalize the information about the brand, product, and/or store with other brand, product, and/or store information. Identifying the data record in a third party data store that matches the brand, product, and/or store increases the value of the social information associated with the image.

Images can be identified as brand, product, or store images by following the link from the image to the original source. If the image was sourced from a third party, such as Google, then the original source can be found by following a second link back to the original source of the image.

Advertisers can use the meta-information associated with an image to target ads for the user. If there is no meta-information associated with the image on the social site then the addition of the meta-information, through the methods described above, enables advertisers to match ads that are relevant to the images with no meta-information on the social site. The social sentiment analysis of the user comments enables the advertiser to further refine the ad that is served to the user when viewing the social page. If the user comments are positive about the brand, product or store, then an ad that is related to the brand, product, or store can be shown. Otherwise if the comments are negative about the brand, product, or store then an ad from the same category about a brand, product or store that has positive opinions, interests, or thoughts about it can be shown. The selection of brand, product, or store in the ad can be based on a broad set of opinions from a general set of users or can be based on the opinions of users on the social network who are found to have the same opinions, interests, or thoughts via the clustering mechanism described above or some other social opinion, interest, or thought matching algorithm to find the content of the ad most suitable for the user. Further, refinements to the ad selection algorithm can be made using the location of the users in the cluster. If the users in a cluster are found to be in the same locality, state, country, or have the same sex, language, or other characteristics then this information in combination with the fine grained social opinions can be used to serve the ads. In order to match ads with cluster the ads themselves need meta-information about the brand, product, and/or store as well as information about the type of message that the ad is aimed at conveying to the user.

Automatic identification of products on image based social networking sites using product images is another advantage of an embodiment of the present invention. Users of social bookmarking sites like Pinterest add images, the URL for the image page, and the title of the page which the image is located on to their collections. The rich meta-information contained in the URL page that the social image points to often includes the product record (i.e. brand name, store name, price, product name, category, specifications, store and brand logos, product image, URL of the product page (known from a source such as a data feed or crawl or user extraction via a widget). The product image which is extracted from the brand site has a unique numerical signature which can be computed using a well-known hashing algorithm. Product records are extracted from product pages and stored in a data store via a web crawl and automatic extraction process as described in a previous patent, a data feed from a publisher (brand or merchant or other data aggregator source (e.g. a product search engine such as Price Grabber), a user based extraction method based on a widget as described in this and previous patents, or other data collection methods. The images from the product record or the social bookmarking service can be stored in a file system using the hash of the name to construct a directory path and file name where the image is stored. A map can be constructed using the hash of the name as the key and the corresponding data record as the value.

Each product page of interest at a brand or store contains a product record. The same product image can be found on the Internet at more than one store or brand product page. Each data record contains to a different URL where the data record was found. Data records for pages from different URLs (i.e. the store sites and/or brand site) in the data store that have the same product record can be created using the image hash that uniquely identifies the product record. Product records with the same image hash are clustered together. The product records in each product cluster are added to the cluster map. The cluster map key is the image hash and the value is the list of product records that contain the image hash. Clusters with different image hashes but the some of the same meta-information from the page titles are compared to see if the clusters should be joined.

Meta-information in the title of and body of pages found at social bookmarking sites can be used to compare the information in 2 or more pages that may not contain the same exact product images. The images may be from the same original image but differ due to cropping, the adding of watermarks, transformations, and other image alteration techniques. Detection of the object in the image from the same original source can be done using a convolution filter or some other outline detection mechanism in conjunction with a pixel value range comparison after the images are aligned. If the images are from different sources advanced image processing comparison techniques may be used to compare the images because of different camera angles, lighting conditions, and camera properties.

The information extracted from social bookmarking site pages and in product records found in a data store at the local site is used to cluster with different images of the same product. The textual information is used to find potentially similar product records. The images in the similar product records are then analyzed by the image processing service to join existing clusters and/or add products to clusters and/or create new clusters. Comparison of image signatures can thus be used in conjunction with limited, semi, and/or complete product record information to identify products in visual social bookmarking or catalog sites.

Matching images in a visual social catalog to a product record facilitates the serving of ads on the social catalog site, brand analytics on the social catalog site, conversion of links on the social catalog site to affiliate marketing links for commission based programs so that when the user clicks on the link to the page at the original site which contains the image, a cookie is set on the user's computer. If the user buys something at the site, the store pays a commission to the referring site. Additional advantages include adding meta-information about the product to the visible text on the page to give the viewer additional information about the product. Another advantage of the system is setting keywords in meta tags and descriptions for search engines to index. Other SEO and SEM advantages that adding keywords to pages have are not described here but are well understood in the Internet community.

Furthermore, the merging of structured data and social networking information greatly increases the accuracy of search results where qualitative results are desired. The probability of finding useful information in response to search keywords is significantly greater. Moreover, because the data store contains more complete information, such as numeric attribute information which describe the data store elements (e.g., the size of an object) and qualitative information (e.g., an expert's opinion of the durability of an object), searches can be conducted using general descriptions of the objects (e.g., search for a digital SLR which is within a certain dimension range and longevity) or searches can be conducted using the category, brand, store, and social rating of the former. Conventional search engines, by contrast, return results that require the user to manually validate, sort, and filter the search results. In the case of conventional search engines that return links based on popularity, the user must search through the list of links to find relevant web pages and manually search social networking services to find corresponding qualitative data.

Other goals and advantages of the invention will be further appreciated and understood when considered in conjunction with the following description and accompanying drawings. While the following descriptions may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

SUMMARY OF THE INVENTION

In accordance with the present invention, there is provided methods and systems for implementing extracting and structuring information obtained from the web and combining it with processed and rated qualitative and measurable attribute information from social networking services, providing a structured and social data aggregator that can provide highly relevant search results, especially pertaining to product information.

In accordance with the present invention, there is provided a product information crawler which crawls the Internet in search of web pages relevant to a requested subject or product. The web pages crawled by the product information crawler can be provided by a seed queue, or calculated based on user input. The product information crawler transmits captured web pages to a structured data extractor which extracts product information.

Additionally, a social networking crawler crawls social networking services in search of social network information relevant to the requested subject or product. The social networking crawler transmits the social network information to the social rating data analyzer which rates and classifies the social information. Finally, the processed product information and processed social network information is transmitted to an information aggregator, which merges the product information and social information and stores it in a data store that can be queried by a user. A user is able to conduct a single search about a subject or product, and retrieve highly relevant structured product information enhanced by social networking information.

The invention may also classify product information when processed by the structured data extractor by transmitting the product information record to a product classifier. The product classifier includes a product category dictionary which comprises a collection of product classifications. In addition, the synonyms of the product category words and phrases are included in the product category dictionary to map words found in documents to their base words which are to be classified. Each word in the dictionary has a bit mask. The bit mask has one bit representing the presence of the word as a baseword or synonym, and one bit each to record the presence of the word as a major, minor, other and/or leaf in the product category tree. The product information record transmitted to the product classifier may comprise fields such as product name, breadcrumb, title and URL. The product classifier selects the best match for the product information to the classifications in the product category dictionary. The classification is inserted into the product information record rendering a classified product information record.

In one embodiment of the present invention, the product category dictionary comprises a series of product category tuples containing multiple elements, the first of which is the major category. In another embodiment of the present invention, the product classifier can also include a product synonym description file. The synonym description file comprises a collection of descriptions for each major category. For example, "laptop" and "notebook" will link to the major category of "computers".

In one embodiment of the present invention, the product information record contains a product name, breadcrumb, title and URL fields. The fields are tokenized into units. The product information record units are looked up in the product category dictionary, and only the words or phrases that exist in the product category dictionary or synonym description file are returned in the form of tokens. The words that are not in the product category dictionary are discarded. Tokens consist of the token text which is a word or a phrase, and the additional info which further explains the semantics of that word and a bitmask which contains the baseword, synonym, major/minor/other/leaf bits. The product classifier sorts each of the extraction record field tokens into their corresponding major "groups". For improved performance, each token may represented by its unique dictionary number. Each major category group contains product information record units related only to its corresponding major category. For each of the original product information record units (product name, title, breadcrumb and URL) is a corresponding major category group which contains list of tokens that appear in the product information record and fall into that particular major category group. The product classifier replaces synonyms with their corresponding base words for the appropriate major. Each synonym can be interpreted differently for different major category groups. For example, synonym "notebook" in "computers" major group would be replaced with "laptop", but in "office supplies" major group would have stayed the same. The product classifier creates an analysis object for each product information record which provides information as to which algorithm is best suited to classify the product information record. The product classifier calculates product category tuple scores for each product information record unit by matching every possible candidate for product category field with the product information record. The product classifier selects the appropriate classification for product information record by selecting a selection algorithm based on the corresponding analysis object. The selection algorithm determines which of the taxonomies associated with the product information record units should be used to classify the product information record.

One embodiment of the present invention may also classify social information when processed by the social rating data analyzer by transmitting the social information record to a social classifier. The social classifier conducts semantic analysis of user opinions on objects, such as products or brands. Additionally, the social classifier could conduct semantic analysis detecting user opinion on various product features, store and brand policies and service, durability of the product, suitability of the product, the longevity of the product, the design of the product, brand attributes, comparison of the product or brand to other brands, pricing, performance, problem, deal, purchase, question, recommendation, satisfaction, value, wish, design, specification, construction, customer service. "The product lasted 1 year" is a qualitative example. The design of the product is "cool" is a qualitative example. The social classifier includes a social rating dictionary, which comprises a collection of words that the social classifier can use to detect meaning in the social information record. The social information record transmitted to the social classifier may comprise fields such as text, ID, user, receiver, location, date, and the like. The social classifier selects the best match for the social information record to the classifications in the social rating dictionary. The social classification is inserted into the social information record rendering a classified social information record.

In one embodiment of the present invention, the social information record is tokenized by splitting the social information record into tokens. The tokens comprise words or phrases that contain useful information, such as token type. The social information record tokens are looked up in the social rating dictionary to determine if the token type is phrase, category synonym, URL, name of a manufacturer, currency, or the like. Statistics about brand or product categories are generated by counting the number of occurrences of a social category in the social information records about a brand. Trends are detected for a brand or a product by counting the number of each occurrence of a social category each day. The trend detector indicates if a branding is increasing, decreasing, or remains the same with respect to the previous day or time period. Brands want to know if their users and the people talking about the brand think that the brand is improving or getting worse in each category. Spike detection is used to detect "events" in the social record stream that indicate that something good or bad has occurred. The spike detector can detect if a new software release has a problem, if a new release of a cell phone is well received or rejected by consumers. Real time detection of up or down spikes aids brands in managing their reputation in real time. Brands are able to respond to events before the events spiral out of the brand's ability to engage in damage control. Brands can also find out when there is a new use for the product that is suddenly popular.

Comparison of brands and products by social categories allows consumers and brand managers to see how one brand or product compares to another brand or product in the different fine grained social categories. The comparisons between the brands and/or products can be displayed for the user in a graph, histogram, or table. Social information records containing comparisons of brand and products attribute allows users to see what users think about the comparison of the different brands or products by specific product attributes. The products have attributes which can be compared with other products. For example, a consumer can compare a Samsung S3 with an iPhone 4. The user can say one phone is better the other. Or the user can say that battery life of one phone is better than the other phone. The comparisons of product attributes between different products from different social information records can be accumulated. The product with the best accumulated score for the product attribute can be shown as the attribute winner. An overall winner can be chosen using all of the accumulated attribute. The accumulated information can be displayed on a web browser.

BRIEF DESCRIPTION OF THE DRAWINGS

A complete understanding of the present invention may be obtained by reference to the accompanying drawings, when considered in conjunction with the subsequent, detailed description, in which.

DETAILED DESCRIPTION

Figure 1:
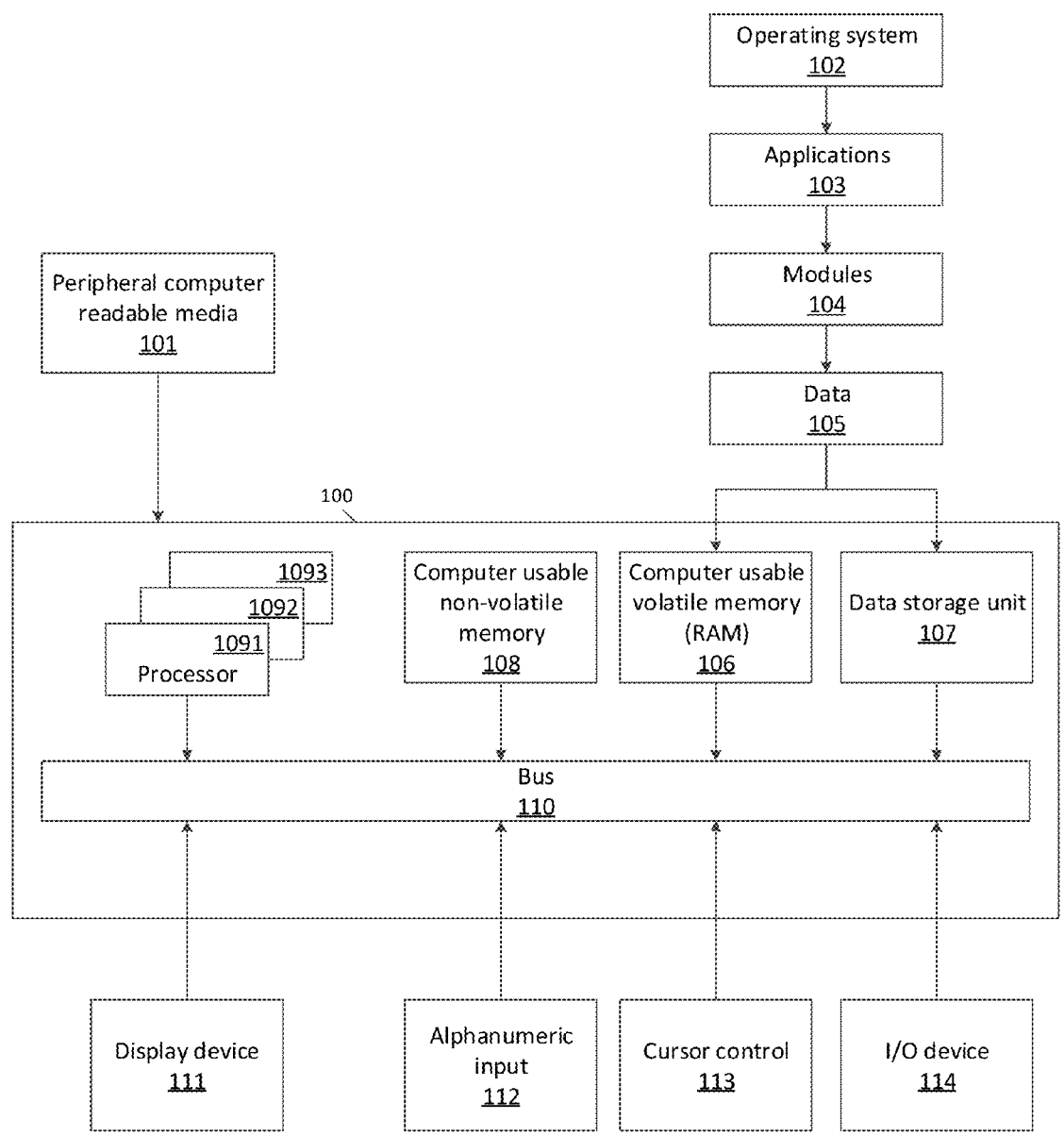
FIG. 1 is a block diagram of a computer system.

Before the invention is described in further detail, it is to be understood that the invention is not limited to the particular embodiments described, as such may, of course, vary. It is also to be understood that the terminology used herein is for the purpose of describing particular embodiments only, and not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed with the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, if dates of publication are provided, they may be different from the actual publication dates and may need to be confirmed independently.

Example Computing System

The present technology may be described in the general context of computer-executable instructions stored on computer readable medium that may be executed by a computer. However, one embodiment of the present technology may also utilize a distributed computing environment where tasks are performed remotely by devices linked through a communications network.

A computer system typically includes a monitor, computer, a keyboard, a user input device, a network interface, and the like. In one embodiment of the present invention, user input device is typically embodied as a computer mouse, a trackball, a track pad, wireless remote, and the like. User input device typically allows a user to select objects, icons, text and the like that appear on the monitor.

Embodiments of network interface typically include an Ethernet card, a modem (telephone, satellite, cable, ISDN), (asynchronous) digital subscriber line (DSL) unit, and the like. A network interface is typically coupled to a computer network. In other embodiments, network interface may be physically integrated on the motherboard of computer, may be a software program, such as DSL, or the like. Computer typically includes familiar computer components such as a processor, and memory storage devices, such as random access memory (RAM), disk drives, and system bus interconnecting the above components.

In one embodiment, computer is a PC compatible computer having one or more microprocessors from Intel Corporation, or the like. Further, in one embodiment of the present embodiment, computer typically includes a UNIX-based or Windows operating system. RAM and disk drive are examples of tangible media for storage of date, audio/video files, computer programs, user profile card data, user social network related data, social distance computation programs, hierarchal position data, social network filtering criteria, other embodiments of the present invention and the like. Other type of tangible media include magnetic storage media such as floppy disks, hard disk, removable hard disks, optical storage media such as CS-ROMS, DVEs, bar codes, holographic; semiconductor memories such as flash memory, read-only memories (ROMs) volatile memories; networked storage devices; and the like. In one embodiment of the present invention, computer system may also include software that enables communications over a network such as the HTTP, TCP/IP, RTP/RTSP protocols, and the like. In alternative embodiments of the present invention, other communications software and transfer protocols may also be used, for example IPX, UDP or the like.

With reference now to FIG. 1, portions of the technology for providing computer-readable and computer-executable instructions that reside, for example, in or on computer-usable media of a computer system. That is, FIG. 1 illustrates one example of a type of computer that can be used to implement one embodiment of the present technology. Although computer system 100 is an example of one embodiment, the present technology is well suited for operation on or with a number of different computer systems including general purpose networked computer systems, embedded computer systems, routers, switches, server devices, user devices, various intermediate devices/artifacts, standalone computer systems, mobile phones, personal data assistants, and the like. In one embodiment, computer system 100 includes peripheral computer readable media 101 such as, for example, a floppy disk, a compact disc, and the like coupled thereto.

Computer system 100 also includes an address/data bus 110 for communicating information, and a processor 1091 coupled to bus 110 for processing information and instructions. In one embodiment, computer system 100 includes a multi-processor environment in which a plurality of processors 1091, 1092, and 1093 are present. Conversely, computer system 100 is also well suited to having a single processor such as, for example, processor 1091. Processors 1091, 1092, and 1093 may be any of various types of microprocessors. Computer system 100 also includes data storage features such as a computer usable volatile memory 106, e.g. random access memory (RAM), coupled to bus 110 for storing information and instructions for processors 1091, 1092, and 1093.

Computer system 100 also includes computer usable non-volatile memory 108, e.g. read only memory (ROM), coupled to bus 110 for storing static information and instructions for processors 1091, 1092, and 1093. Also present in computer system 100 is a data storage unit 107 (e.g., a magnetic or optical disk and disk drive) coupled to bus 110 for storing information and instructions. Computer system 100 also includes an optional alpha-numeric input device 112 including alpha-numeric and function keys coupled to bus 110 for communicating information and command selections to processor 1091 or processors 1091, 1092, and 1093. Computer system 100 also includes an optional cursor control device 113 coupled to bus 110 for communicating user input information and command selections to processor 1091 or processors 1091, 1092, and 1093. In one embodiment, an optional display device 111 is coupled to bus 110 for displaying information.

Referring still to FIG. 1, optional display device 111 may be a liquid crystal device, cathode ray tube, plasma display device or other display device suitable for creating graphic images and alphanumeric characters recognizable to a user. Optional cursor control device 113 allows the computer user to dynamically signal the movement of a visible symbol (cursor) on a display screen of display device 111. Implementations of cursor control device 113 include a trackball, mouse, touch pad, joystick or special keys on alphanumeric input device 112 capable of signaling movement of a given direction or manner of displacement. Alternatively, in one embodiment, the cursor can be directed and/or activated via input from alphanumeric input device 112 using special keys and key sequence commands or other means such as, for example, voice commands. Computer system 100 also includes an I/0 device 114 for coupling computer system 100 with external entities. In one embodiment, I/0 device 114 is a modem for enabling wired or wireless communications between computer system 100 and an external network such as, but not limited to, the Internet. Various other components are depicted for computer system 100. Specifically, when present, an operating system 102, applications 103, modules 104, and data 105 are shown as typically residing in one or some combination of computer usable volatile memory 106, e.g. random access memory (RAM), and data storage unit 107. However, in an alternate embodiment, operating system 102 may be stored in another location such as on a network or on a flash drive. Further, operating system 102 may be accessed from a remote location via, for example, a coupling to the Internet. In one embodiment, the present technology is stored as an application 103 or module 104 in memory locations within RAM 106 and memory areas within data storage unit 107.

Exemplary System Architecture of the Invention

Figure 2:
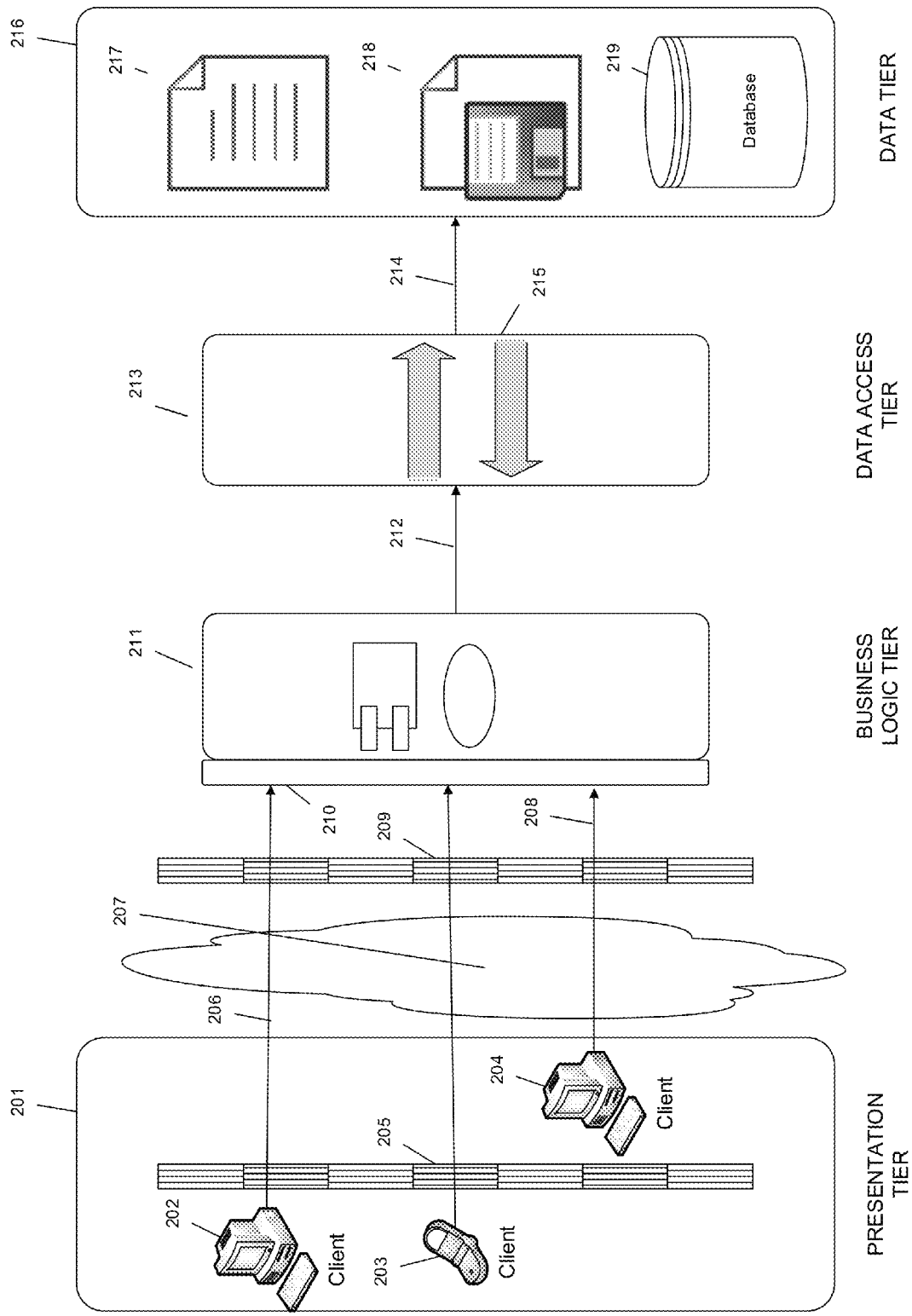
FIG. 2 is a block diagram of a distributed system.

An exemplary system architecture of the invention is described below in connection with FIG. 2. According to an embodiment of the present invention, the system may be comprised at least in part of off-the-shelf software components and industry standard multi-tier (a.k.a. "n-tier", where "n" refers to the number of tiers) architecture designed for enterprise level usage. One having ordinary skill in the art will appreciate that a multitier architecture includes a user interface, functional process logic ("business rules"), data access and data storage which are developed and maintained as independent modules, most often on separate computers.

According to one embodiment of the present invention, the system architecture of the system comprises a Presentation Logic Tier 201, a Business-Logic Tier 211, a Testing Tier, a Data-Access Tier 213, and a Data Tier 216.

The Presentation Logic Tier 201 (sometimes referred to as the "Client Tier") comprises the layer that provides an interface for an end user into the application (e.g., session, text input, dialog, and display management). That is, the Presentation Logic Tier 201 works with the results/output 206, 208 of the Business Logic Tier 211 to handle the transformation of the results/output 206, 208 into something usable and readable by the end user's client machine 202, 203, 204. Optionally, a user may access using a client machine 202 that is behind a firewall 205, as may be the case in many user environments.

The system uses Web-based user interfaces, which accept input and provide output 206, 208 by generating web pages that are transported via the Internet through an Internet Protocol Network 207 and viewed by the user using a web browser program on the client's machine 202, 204. In one embodiment of the present invention, device-specific presentations are presented to mobile device clients 203 such as smartphones, PDA, and Internet-enabled phones. In one embodiment of the present invention, mobile device clients 203 have an optimized subset of interactions that can be performed with the system.

According to an embodiment of the present invention, the Presentation Logic Tier 201 may also include a proxy 210 that is acting on behalf of the end-user's requests 206, 208 to provide access to the Business Logic Tier 211 using a standard distributed-computing messaging protocol (e.g., SOAP, CORBA, RMI, DCOM). The proxy 210 allows for several connections to the Business Logic Tier 211 by distributing the load through several computers. The proxy 210 receives requests 206, 208 from the Internet client machines 202, 204 and generates html using the services provided by the Business Logic Tier 211.

The Business Logic Tier 211 contains one or more software components for business rules, data manipulation, etc., and provides process management services (such as, for example, process development, process enactment, process monitoring, and process resourcing). In addition, the Business Logic Tier 211 controls transactions and asynchronous queuing to ensure reliable completion of transactions, and provides access to resources based on names instead of locations, and thereby improves scalability and flexibility as system components are added or moved. The Business Logic Tier 211 works in conjunction 212 with the Data Access Tier 213 to manage distributed data store integrity. The Business Logic Tier 211 also works in conjunction with the Testing Tier. Optionally, according to an embodiment of the present invention, the Business Logic Tier 211 may be located behind a firewall 209, which is used as a means of keeping critical components of the system secure. That is, the firewall 209 may be used to filter and stop unauthorized information to be sent and received via the Internet-Protocol network 207.

The Data-Access Tier 213 is a reusable interface that contains generic methods 215 to manage the movement 214 of Data 219, Documentation 217, and related files 218 to and from the Data Tier 216. The Data-Access Tier 213 contains no data or business rules, other than some data manipulation/ transformation logic to convert raw data files into structured data that Innovations may use for their calculations in the Testing Tier.

The Data Tier 216 is the layer that contains the Relational Database Management System (RDBMS) 219 and file system (i.e., Documentation 217, and related files 218) and is only intended to deal with the storage and retrieval of information. The Data Tier 216 provides data store management functionality and is dedicated to data and file services that may be optimized without using any proprietary data store management system languages. The data management component ensures that the data is consistent throughout the distributed environment through the use of features such as data locking, consistency, and replication. As with the other tiers, this level is separated for added security and reliability.

It will be readily apparent to one of ordinary skill in the art that many other hardware and software configurations are suitable for use with the present invention. For example, the use of other microprocessors are contemplated, such as Intel microprocessors; microprocessors from Advanced Micro Devices, Inc.; microprocessors from Motorola, Inc.; and the like. Further, other types of operating systems are contemplated such as Windows operating systems from Microsoft Corporation, Solaris from Oracle, MAC OS from Apple Computer Corporation, LINUX, UNIX, and the like.

One embodiment of the present invention provides methods and systems for extracting and structuring information obtained from the web and combining it with processed and rated qualitative and measurable attribute information from social networking services, providing a structured and social data aggregator (SSDA) that can provide highly relevant search results, especially pertaining to product information. The context in which the invention can be implemented may vary. For non-limiting examples, one embodiment may be implemented for public or private search engines, job portals, shopping search sites, travel search sites, and the like. Embodiments of the invention are described herein primarily in the context of a World Wide Web (WWW) search system, for purposes of an example. However, the context in which embodiments are implemented is not limited to Web search systems. For example, embodiments may be implemented in the context of private enterprise network (e.g., intranet), as well as the public network (i.e. the Internet).

Figure 3:
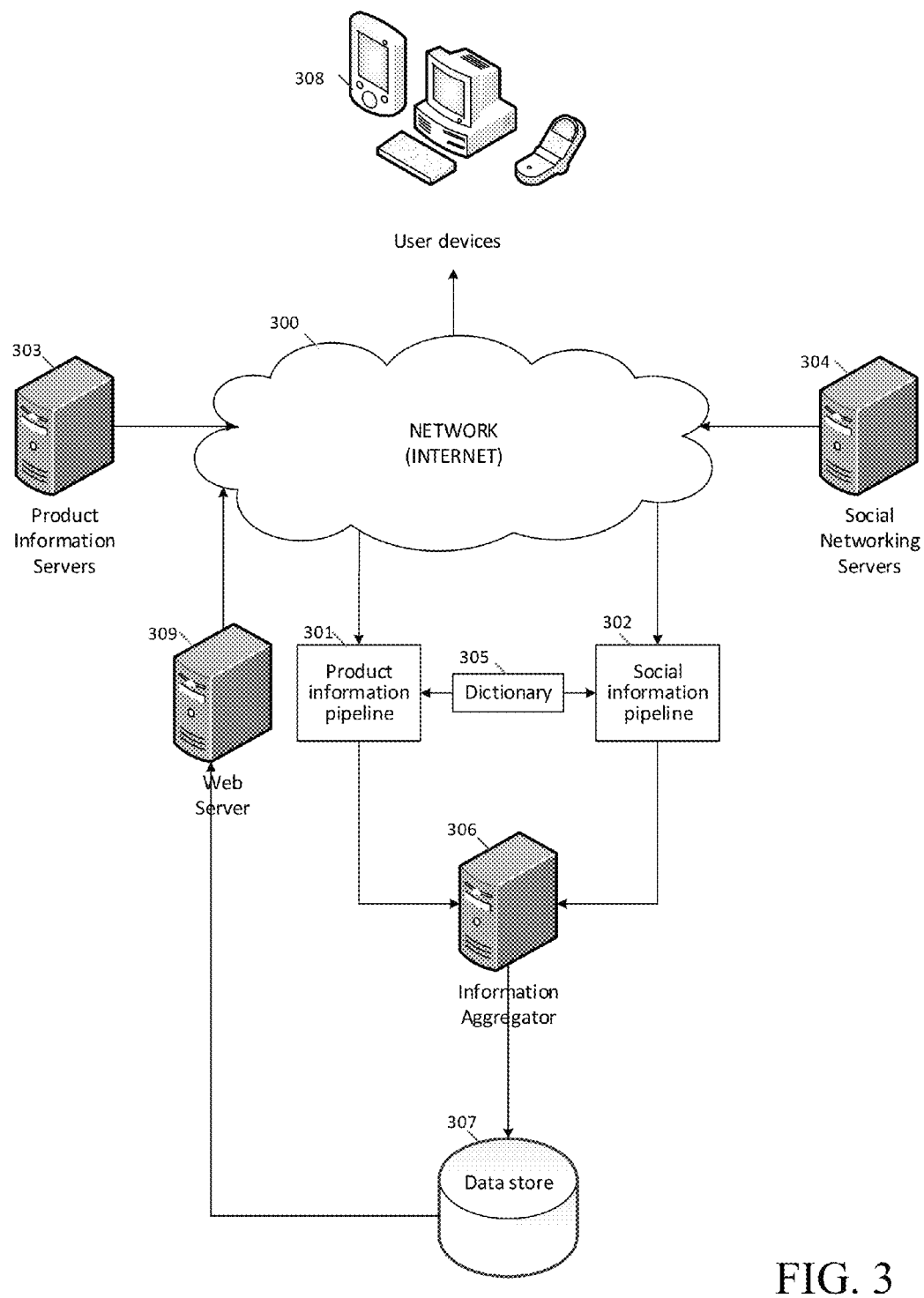
FIG. 3 is a simple block diagram of a product information pipeline and a social information pipeline.

FIG. 3 shows an overview of a system in which an embodiment of the invention can be implemented. System consists of product information pipeline 301 and social information pipeline 302 communicatively coupled to a plurality of product information servers 303 and social networking servers 304 via a network 300, such as the Internet. In various embodiments, product information pipeline 301 and social information pipeline 302 consist of different elements used for product information processing and social information processing, respectively. These two information pipelines rely on various dictionaries 305 in order to conduct product and social information processing. Product information pipeline 301 and social information pipeline 302 transmit product information records and social information records to information aggregator 306. Information aggregator 306 merges product information records with associated social information records, and saves said merged information in data store 307. A plurality of users 308 are coupled to web server 309 via a network 300, such as the Internet. Users may be any conventional access device. Users 308 can access the merged information residing in data store 307 by issuing queries to web server 309 via network 300.

Figure 4:
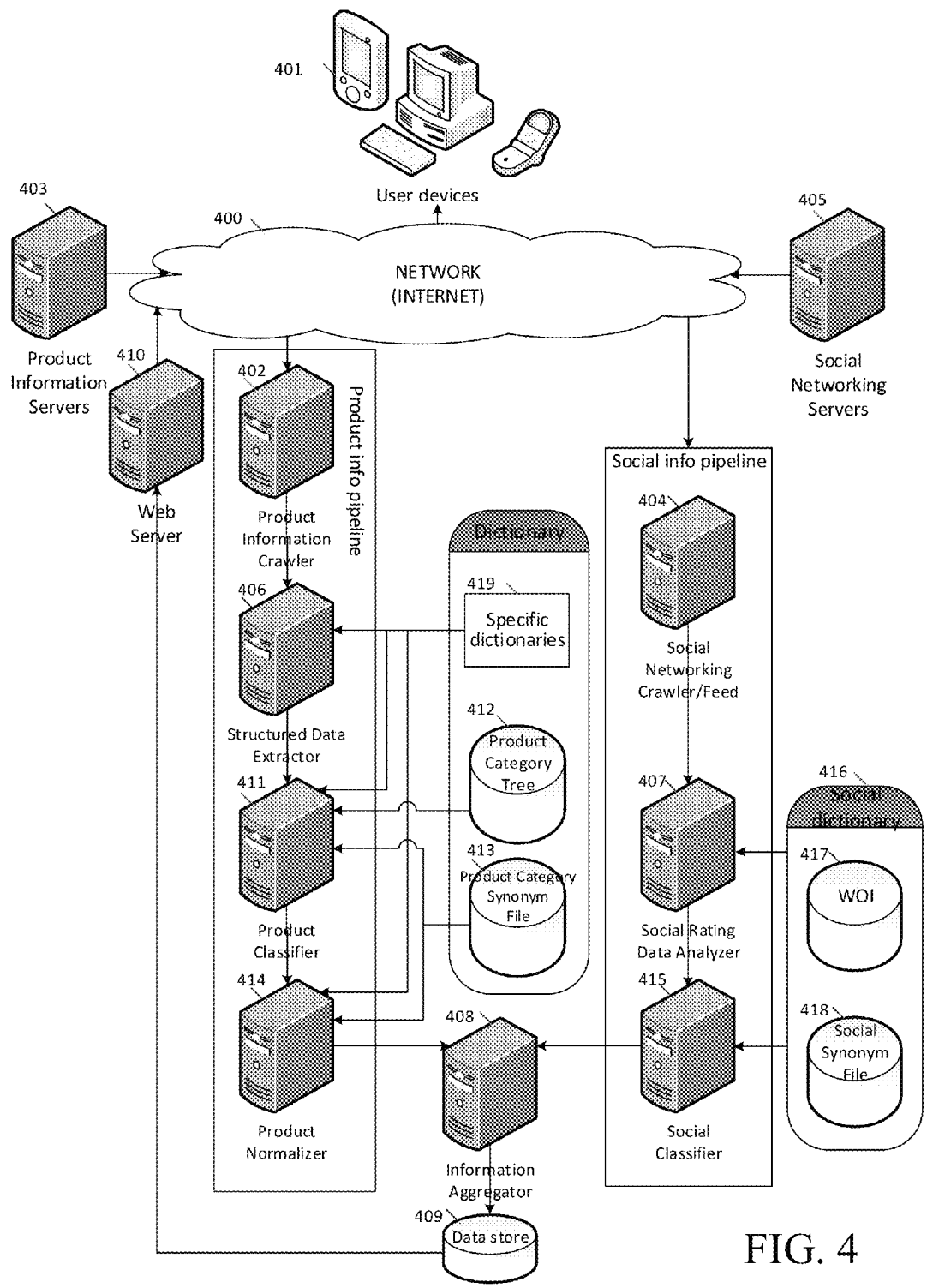
FIG. 4 is a detailed block diagram of a product information pipeline and a social information pipeline.

FIG. 4 shows an embodiment of the invention which can be implemented in a system comprising a product information crawler 402, communicatively coupled to a plurality of product information servers 403, and a social networking crawler 404, communicatively coupled to a plurality of social networking servers 405 via a network 400, such as the Internet. Although illustrated as implemented on separate computers, it will be appreciated that a product information crawler 402 and social networking crawler 404 can be implemented on the same computer. An embodiment of the present invention further comprises structured data extractor 406, social rating data analyzer 407, information aggregator 408, and data store 409. A plurality of users are coupled to server via a network 400, such as the Internet. In one embodiment, users may be any conventional access device 401, such as a computer, a web-enabled telephone, a personal digital assistant, or the like. In operation, users access web server 410 and then make one or more requests for data. The data that is returned is typically displayed back to user.

In one embodiment, web server 410 may be embodied, as described above, and include one or more servers (e.g., server cluster) that respond to requests from users. For example, multiple servers may be used in embodiments where server performance is important. Data store 409 may be a distributed data storage system such Apache Hadoop, or the like. In other embodiments, data store 409 may be any conventional data store 409 such as MySQL, Oracle, Microsoft SQL Server, IBM DB2, or the like. In other embodiments, data store 409 may be any other data source. In one embodiment, data store 409 is configured to store and maintain search index information. As illustrated, data store 409 may be coupled to web server 410 to send and receive respective data and to information aggregator 408 to receive data, as will be described below.

In one embodiment, product information crawler 402 and social networking crawler 404 are stand-alone computer systems configured to send and receive data from network 400, with product information crawler 402 configured to process product information websites and social networking crawler 404 configured to process social networking servers 405. Additionally, in one embodiment, product information crawler 402 is configured to provide product information data to structured data extractor 406, and social networking crawler 404 is configured to provide social information to social rating analyzer. In one embodiment, either product information crawler 402 or social networking crawler 404 may be integrated as part of each other, or as part of web server 410, or the like.

Product Information Processing. Product information crawler 402 processes web pages accessed from product information servers 403. Generally, web crawlers (also referred to as "crawler", "spider", "robot") such as product information crawler 402, crawl across the Internet in a methodical and automated manner to locate web pages. In one embodiment, a seed queue stores URLs to initialize the product information crawler 402. The product information crawler 402 can send a request to the seed queue for a URL for a web site. The product information crawler 402 receives a URL from the seed queue and issues a HTTP request for the web pages at the received URL. The product information crawler 402 receives the contents of the web page in a HTTP reply, typically in HTML. The product information crawler 402 then sends the web page to the structured data extractor 406.

Product information crawler 402 transmits processed web pages to structured data extractor 406. Structured data extractor 406 detects a markup and structured data intersection or patterns which repeat on each web page in a first set of the web pages. Based on the detected intersection or repeating patterns, structured data extractor 406 generates an extraction template. Structured data extractor 406 utilizes the extraction template to extract product information records from the web pages which match the template. Structured data extractor 406 transmits product information records to information aggregator 408.

Social Networking Information Processing. The social networking crawler 402 crawls social networking services on the Internet. The social networking crawler 402 processes the social information and passes it to the social rating data analyzer 407. Social rating data analyzer 407 structures the social information into social information records. Social rating data analyzer 407 transmits social data records to an information aggregator 408. Social classifier 415 receives a social information record from the social rating data analyzer 407. The social classifier 415 conducts semantic analysis of user opinions on objects, such as brands, products or product features. Additionally, the social classifier 415 could conduct semantic analysis detecting user opinions on various product features. The social classifier 415 includes a social rating dictionary 416 which comprises a collection of words that the social classifier can use to detect meaning in the social information record, like words of interests (WOI) 417 and social synonym file 418.

Information Aggregation. Information aggregator 408 merges product information records with associated social information records, and saves said merged information in data store 409. Users 401 can access the merged information residing in data store 409 by issuing queries to web server 410 via network 400. Another embodiment of the invention provides for classifying the product information records. This is advantageous because the product information records can be normalized using product normalizer 414 and classified using product classifier 411, providing for more relevant correspondence to merged social data, and providing more relevant results to users querying the data store 409. The structured data extractor 406 transmits the product information record to a product classifier 411. Structured data extractor uses specific dictionaries 419 like brands, stores, SANs, DFNs, etc. The product information record transmitted to the product classifier 411 may comprise fields such as product name, breadcrumb, title and URL. The product classifier 411 includes a product category tree dictionary 412 which comprises a collection of product classifications. The classifications in the product category tree dictionary 412 may be stemmed, such that only the root of a word is processed, in order to avoid mismatches due to word derivatives. Each product can have one or more classifications from the product category tree dictionary 412. In one embodiment, the product category tree dictionary 412 is in comma separated value (CSV) file format comprising an array of elements in which each element is enclosed with quotes. For example, the product category tree dictionary 412 could have the following classification tuples:

"computers", "adapters", "lan"
"computers", "adapters", "laptop"
"computers", "adapters", "laptop", "auto"

Each line comprises a tuple, and every product category tuple consists of multiple elements, each in lowercase. Depending on the element position within the product category tuple, a product category tuple element can be either: 1) major, a required element which is always the first element in the tuple; 2) minor, the second element in the tuple which appears if the tuple contains more than 2 elements; 3) other, being every element between the minor and the leaf which appears if tuple size is more than 3; or 4) leaf, a required element which is always the last element in the tuple. In an embodiment, the product category tree dictionary 412 consists of several CSV files in which each file contains and is named exactly as one major. In previous example the major is "computers", and its corresponding file is "computers.csv".

The product classifier 411 selects the best match for the product information to the classifications in the product category tree dictionary 412. The classification is inserted into the product information record. In another embodiment, the product classifier 411 can also include a product category synonym description file 413. The product category synonym description file 413 comprises a collection of descriptions for each major category. For example, "laptop" and "notebook" will link to the major category of "computers". Normalizing 414 the product information record with reference to the synonym description file will increase the accuracy of user queries to the data store 409. In the product classifier 411, every synonym is linked to its corresponding major, minor, other or leaf category. Every synonym is replaced with its baseword only in the context of the major category to which it belongs. For example, in the "computers" major category, the minor category "notebook" will be replaced with "laptop", but for major category "office supplies" that will not be the case, since "notebook" is actually a minor category and baseword, not a synonym.

Figure 5:
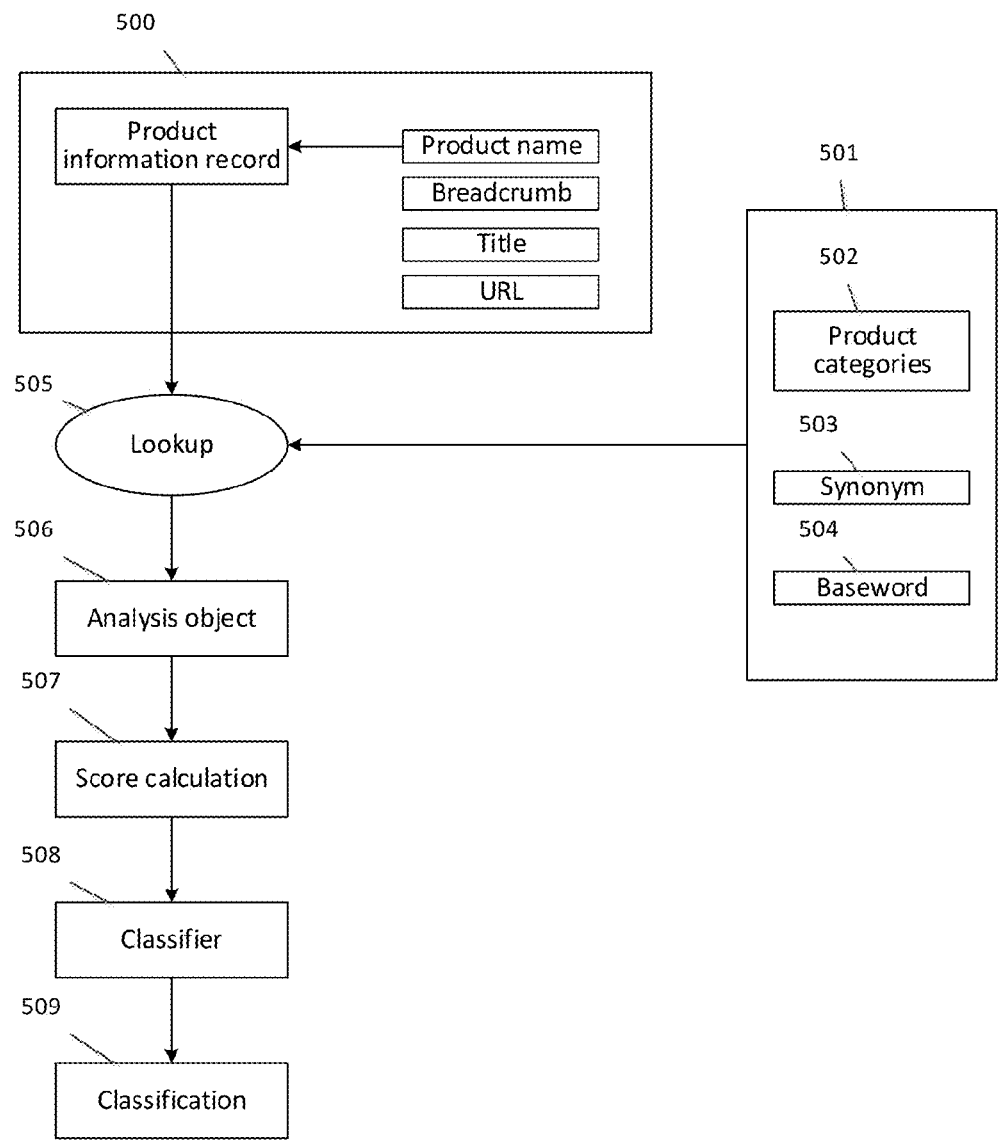
FIG. 5 is a block diagram of product record classification.

Referring now to FIG. 5, in one embodiment, the product information record is classified by tokenizing the product information record 500, grouping the tokens by product categories 502, checking to see if the token is a synonym 503 by matching to the product synonym description file, and if so, replacing the token with the corresponding baseword 504, and in either case creating an analysis object 506 from which a score is calculated 507. The classifier 508 determines the classification 509. The product information record is tokenized by splitting the product information record into units representing product name, breadcrumb, title and URL 500. The product information record units are looked up 505 in the product category dictionary 501, and only the words or phrases that exist in the product category dictionary 501 or synonym description file are returned in the form of tokens. The words that are not in the product category dictionary 501 are discarded. Tokens consist of the token text, which is a word or a phrase, and the additional information which further explains the semantics of that word. The product classifier sorts each of the extraction record field tokens into their corresponding major "groups". For improved performance, each token may be represented by its unique dictionary number. Each product category group contains product information record unit related only to its corresponding product category. For each of the original product information record units (product name, title, breadcrumb and URL) there is a corresponding product category group which contains a list of tokens that appear in the product information record and fall into that particular product category group. The product classifier replaces synonyms with their corresponding base words for the appropriate major, minor, other and leaf words. Each synonym can be interpreted differently for different major, minor, other or leaf category groups. The product classifier creates an analysis object 506 for each product information record which provides information as to which algorithm is best suited to classify the product information record 500. The product classifier calculates product category tuple scores for each product information record unit by matching every possible candidate for product category field with the product information record 500. The product classifier selects the appropriate classification for product information record using a selection algorithm based on the corresponding analysis object. The selection algorithm determines which of the product categories associated with the product information record units should be used to classify the product information record, and that classification is inserted into the product information record. Social messages can be classified by product category using the same method.

Figure 6:
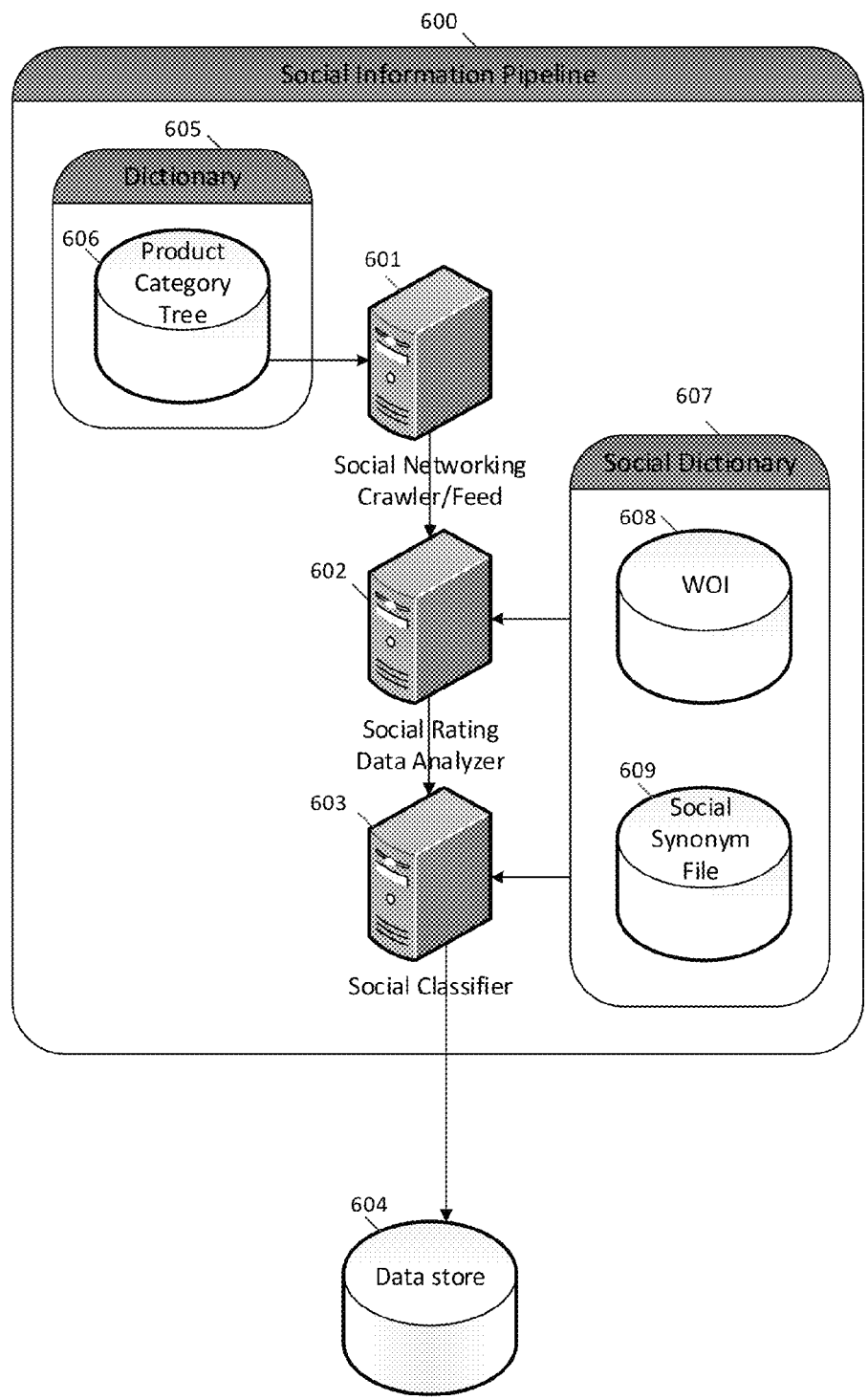
FIG. 6 is a block diagram of the social information pipeline.
Figure 7:
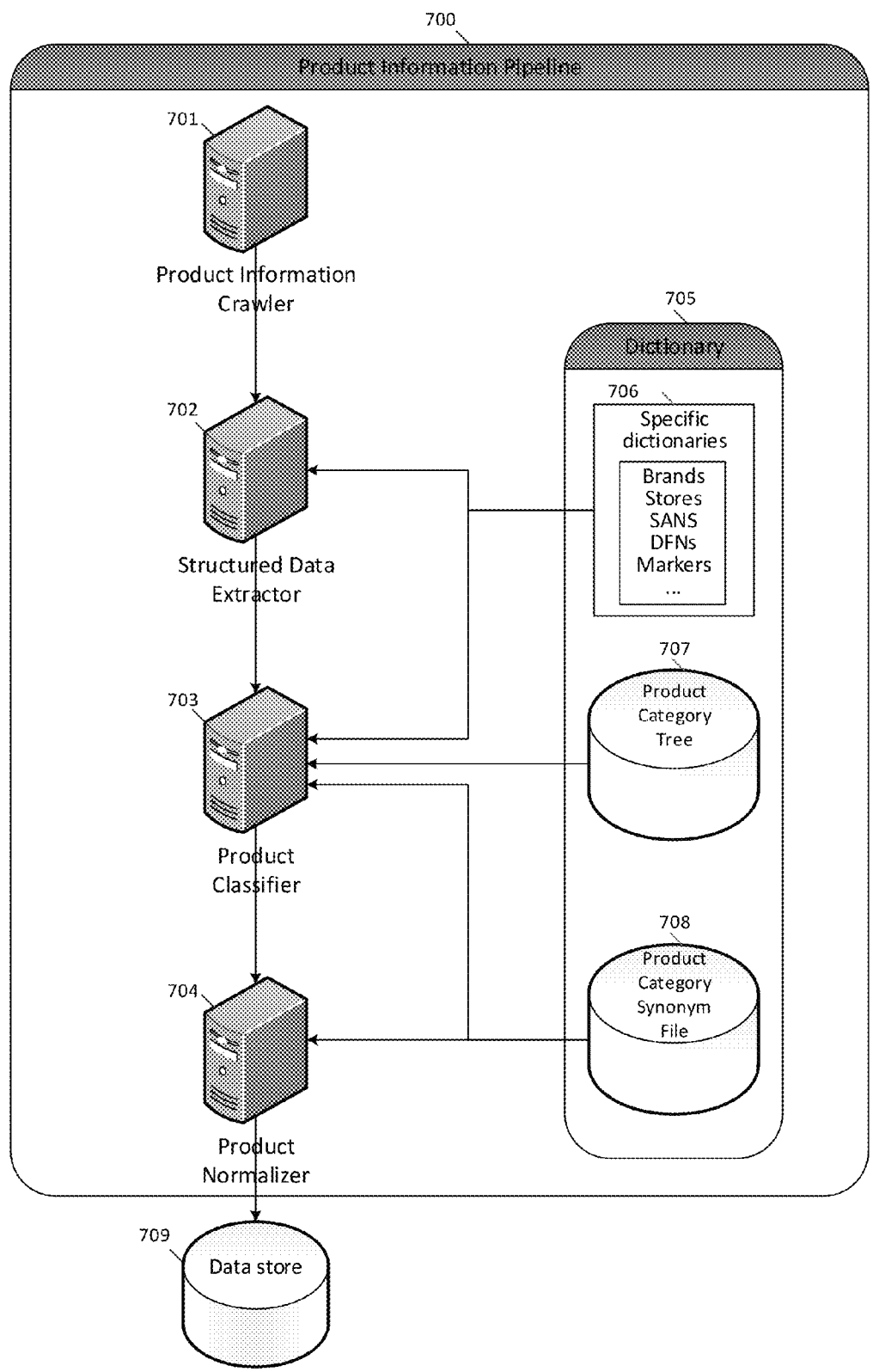
FIG. 7 is a block diagram of the product information pipeline.

Referring now to FIG. 6 now, another embodiment of the invention provides for classifying the social information records by social networking categories such as emotion, opinion, business attribute, product attribute or other non-product classification category. This is advantageous because the social information records can be normalized and classified providing for more relevant correspondence to merged social data, and providing more relevant results to users querying the data store 604. The social classifier 603 receives a social information record from the social rating data analyzer 602, which receives data through the social networking feed 601. The social networking feed is created by using the data provided by the dictionary 605 that uses the product category tree 606 and by crawling. The social classifier 603 conducts semantic analysis of user opinions on objects, such as brands, products or product features. Additionally, the social classifier 603 could conduct semantic analysis detecting user opinions on various product features. The social classifier 603 includes a social rating dictionary 607 which comprises a collection of words of interest (WOI) 608 and a social synonym file 609 that the social classifier 603 can use to detect meaning in the social information record. The social information record transmitted to the social classifier 603 may comprise fields such as text, ID, user, receiver, location, date, and the like. The social classifier 603 selects the best match for the social information record to the classifications in the social rating dictionary 607. The social classification is inserted into the social information record. All of this without the data store comprises the social information pipeline 600.

In one embodiment, the social rating dictionary 607 comprises a collection of words divided into four groups, comprising social networking categories, subcategories, base words, opinions, phrases plural properties and phrases. In another embodiment, the product classifier can also include a social synonym description file 609. The synonym description file comprises a collection of descriptions for each social networking category, which describes a product feature, such as "reliability" or "performance." In one embodiment, these may be stored in a comma separated value (CSV) file format, with each line comprising four elements; the first element is a keyword ("sn_category") that indicates that the next field in the line denotes social networking category name. The second element is the social networking category name. The third element is the keyword ("sn_synonym") that denotes that the next field contains synonym name. The last element is the actual social network category synonym name. Social networking basewords are social rating dictionary 607 words that give crude description of the user's sentiment toward a brand regarding a social networking category that is found in the social information record. For example, a base word can be "good", "bad" or "satisfactory". Base words can also be detected through baseword aliases or phrases. Social networking base word aliases represent base word synonyms, that is, the form of basewords that could be found in social information. Social information is abundant with slang, so there are many forms in which a social networking base word may be found. For example, "cool" is an alias for base word "good". Social networking base word phrases are used to detect user sentiment in social information. They are linked to base words in the same manner as aliases. Phrases are keywords that the program classifier detects in a social information record. Phrases depict the sentiment more accurately than aliases. For example alias "cool" gets totally opposite meaning when a negation word such as "not" is present. Phrase "not cool" is semantically unambiguous. An opinion marker is linked to a phrase and can be either "+" or "−". It depicts either positive or negative connotation of the specified phrase. In the social rating dictionary 607, every social networking category is linked to one or more social networking base words, which is in turn linked to one or more phrases. In another embodiment the social rating dictionary format can be changed into a format of a less descriptive nature that will provide optimization for read and write operations.

In one embodiment, the social information record is classified by first splitting the social information record into tokens. The tokens comprise words or phrases that contain useful information, such as token type. The social information record tokens are looked up in the social rating dictionary to determine if the token type is phrase, category synonym, URL, name of a manufacturer, currency, or the like. Using this information we can construct social semantic trees from a social information record. We can use the trees to make semantic forests out of the social information records and by tree traversals we can determine the exact social classification of the social information record. Duplicates are removed from the system. In another embodiment, the invention can include both a product classifier to classify product information records and a social classifier to classify social information records.

In another embodiment, the invention includes a product information crawler 701, a structured data extractor 702, a product classifier 703 and a product normalizer 704. These four work in coherence to produce a normalized product record that can be stored in a data store 709. The Product information crawler provides the data feed for the structured data extractor that structures the data and makes it accessible for change. The product classifier classifies the provided structured data record with the help of the dictionary 705. The dictionary is consisted of specific dictionaries 706: brands; stores; sans; dlhs; markers; a product category tree 707 and a product category synonym file 708. The product normalizer uses the product synonym file to de-duplicate and normalize the classified structured records. This system, without the data store, comprises the product information pipeline 700.

Social Messages Classification and Analysis

A social brand message is defined as a message in a social network containing a product or brand or store name. Social brand messages can come from different sources such as Facebook, Twitter, Google+, Pinterest, and other social networks. Social brand messages are downloaded from social networks de-duplicated and then classified. The classification pipeline consists of multiple stages. Each stage represents a part of the algorithm. During these stages, the social brand messages are converted into data structures and then those data structures are analyzed, resulting in fine grained classification social message of product and brand by opinion and emotion and product classification in the end. The classifications are then sent to other classification pipelines that use heap-like structures to determine peaks in sentiments and important words in the classifications. All of the processed data is stored in multiple data stores and then presented to the user.

Figure 8:
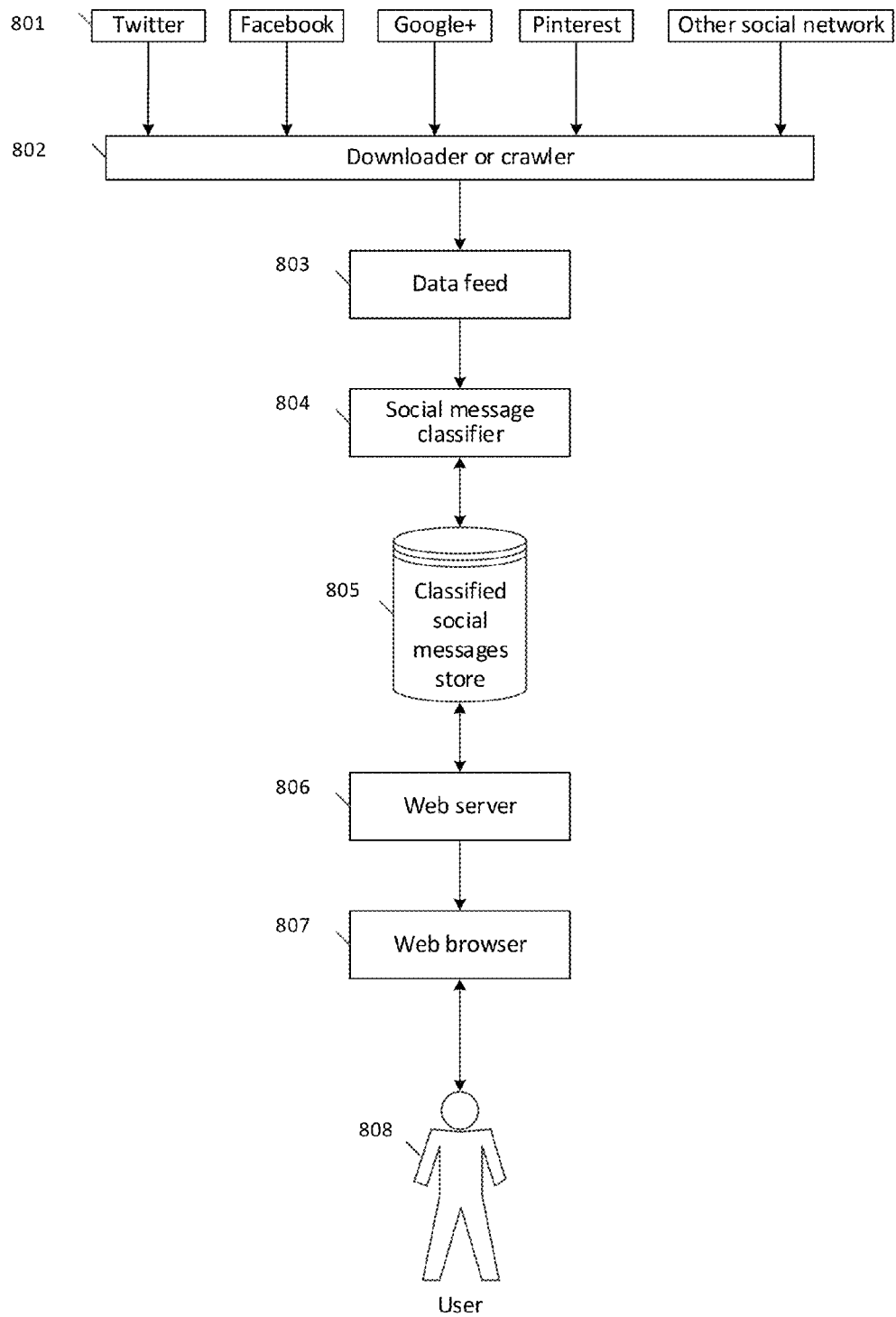
FIG. 8 is a block diagram of the fine grained classification.

FIG. 8 represents general view of fine grained classification. Social brand messages can come from different sources such as Facebook, Twitter, Google+, Pinterest, and other social networks 801. These messages are downloaded and crawled by downloader 802, after which they are normalized and sent as a data feed 803 to the social message classifier 804 which classifies them and stores them to the classified social messages store 805. When a user 808 sends a request for a certain social message classification, the web server 806 accesses the classified social messages store 805 and displays the social message classification to the user on web browser 807.

Unlike the fine grained social brand message classification pipeline, most of the currently available social message sentiment analyzers offer only a choice between a positive and a negative sentiment. Hence, they process each message by binary classification. The fine grained social brand message classifier gives an overall impression for a social message as well as one or more social category and a sub category classification describing information that the users care about.

Figure 9:
FIG. 9 is an example of the social message record binary and fine grained classification.
Figure 9:

FIG. 9 is an example of differences between binary classification and fine grained classification. The social message 901 is classified by a binary sentiment analyzer. The binary sentiment analyzer can only recognize that this social message is positive or negative. The social message 902 is classified by the fine grained classification pipeline. As it is clearly shown, not only did the fine grained sentiment analyzer flag this social message as positive, it also gave it a fine grained category classification. In one embodiment, the fine grained classification engine consists of a 8 stage classification pipeline. Each stage works on a social message record and transforms it into a data structure(s). The most important part is creating the classification tree, from where decision are made, and the final result is the fine grained classification(s) and product classifications.

Figure 10:
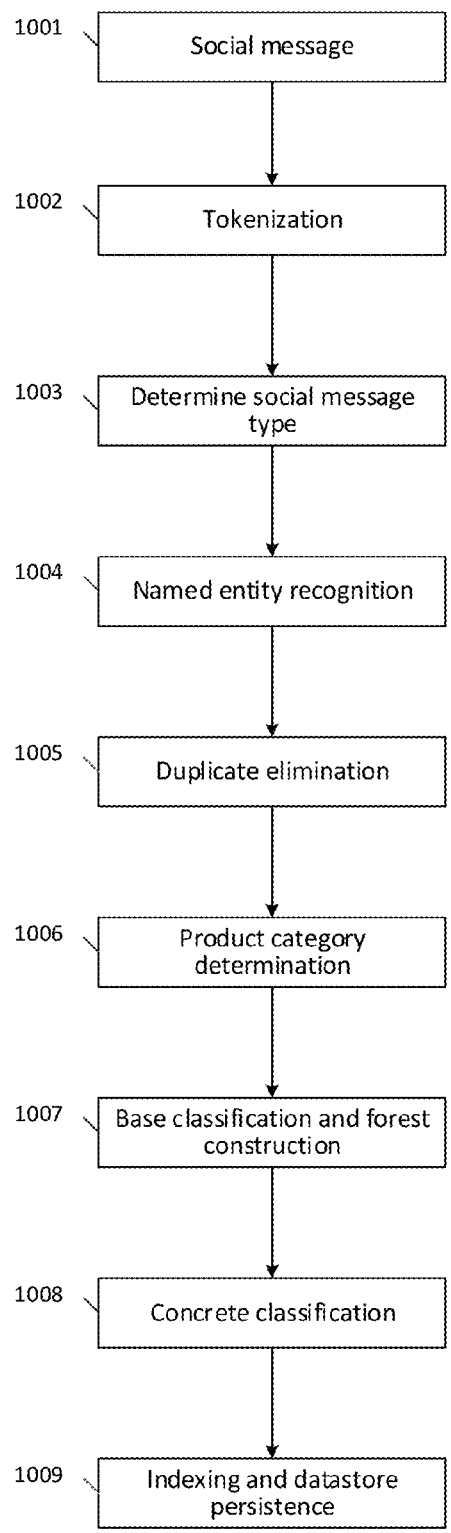
FIG. 10 is a block diagram of the fine grained classification pipeline stages.

FIG. 10 shows an embodiment of the fine grained classification pipeline. The social message record 1001 is tokenized in the tokenization stage 1002. After this, the social message type determination stage follows 1003. Named entity recognition stage 1004 filters the message, after determining the message type. The duplicates are removed from the data feed by the duplicate elimination stage 1005. The product category classification is done in the product category determination stage 1006. This stage is followed by the base classification and forest construction stage 1007, and the final classification of the social message is done by the concrete classification stage 1008. The classified social message record is indexed and stored in the indexing and data store persistence stage 1009, which represents the final stage of the fine grained classification pipeline.

Figure 11:
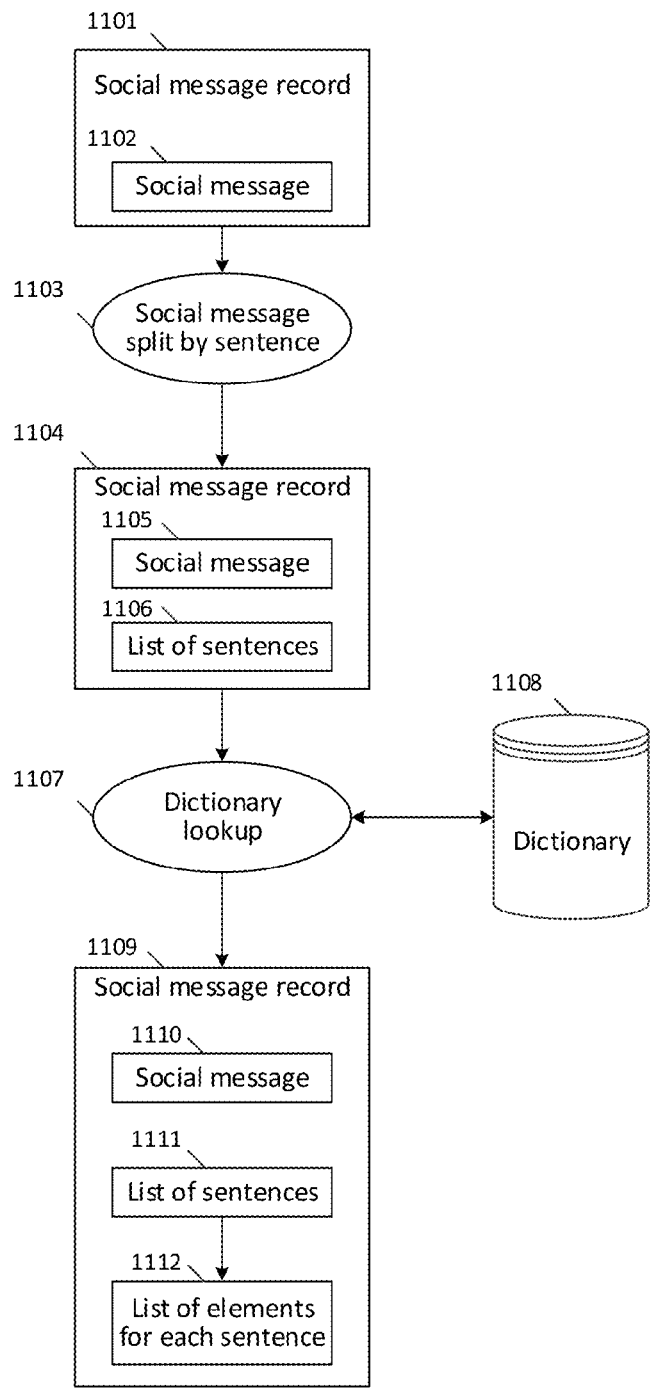
FIG. 11 is a block diagram of the tokenization stage.

FIG. 11 represents the tokenization stage in an embodiment of the fine grained classification pipeline. The social message 1102 is taken from the social message record 1101 and is split into sentences 1103. The social message record 1104 now contains the social message 1105 and the list of sentences 1106 in the social message. Now, the dictionary lookup 1107 uses the dictionary 1108 to find the elements for each sentence. The dictionary 1108 contains the following dictionaries: manufacturer names, social message phrases, social message negation phrases, bad words, products, product categories, names of people and places, problematic brands and action verbs. The social message record 1109 now contains the social message 1110, the list of sentences 1111 and the list of elements for each sentence 1112. Elements can consist of one or more tokens.

Figure 12:
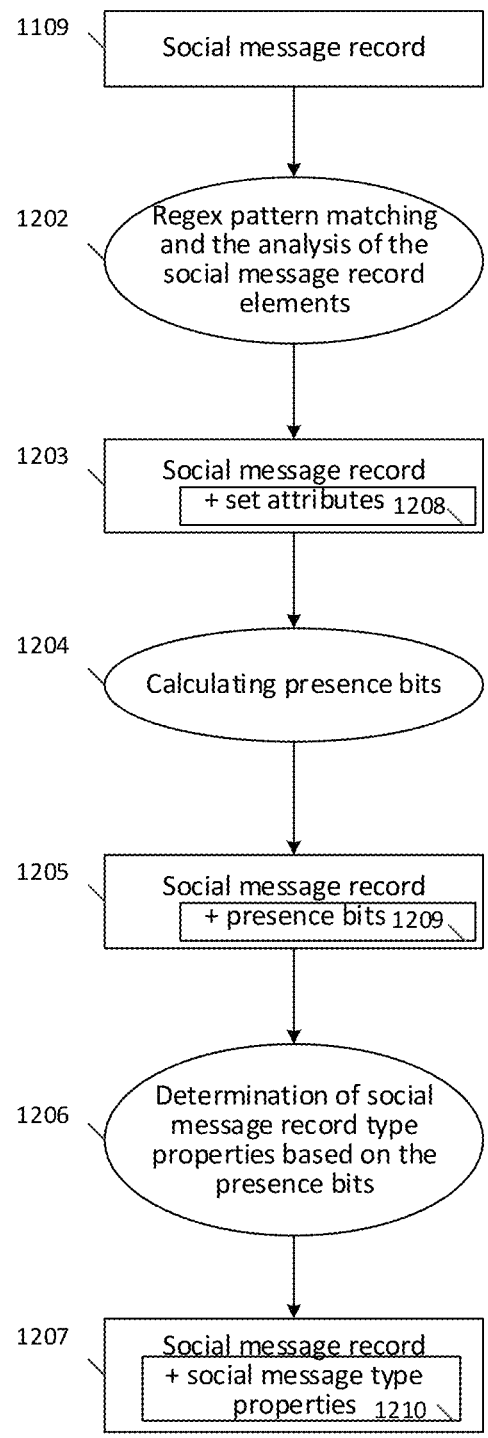
FIG. 12 is a block diagram of the determination of social message record type stage.

FIG. 12 represents determination of social message type stage. The social message record now contains the social message, the list of sentences and the list of elements for each sentence. The social message record 1109 undergoes checks for regex pattern matching and analysis of social message records 1202. Set of attributes 1208 is then added to the social message record 1203, based on the previous step. The attributes list can contain one or more of the following attributes: a URL, a brand, a discount percentage, a price, a product name, quotes, a question mark, a phrase, a verb, an entity, a problematic brand, a product category, a bad word, a retweet token, and a forbidden word. Next, the presence bits are calculated 1204 using the previously determined set of attributes. Now, the social message record 1205 contains the presence bits 1209 as well. After calculating the presence bits, they are used to determine the social message record type properties 1206. Now, the social message record 1207 also contains social message type properties 1210.

Figure 13:
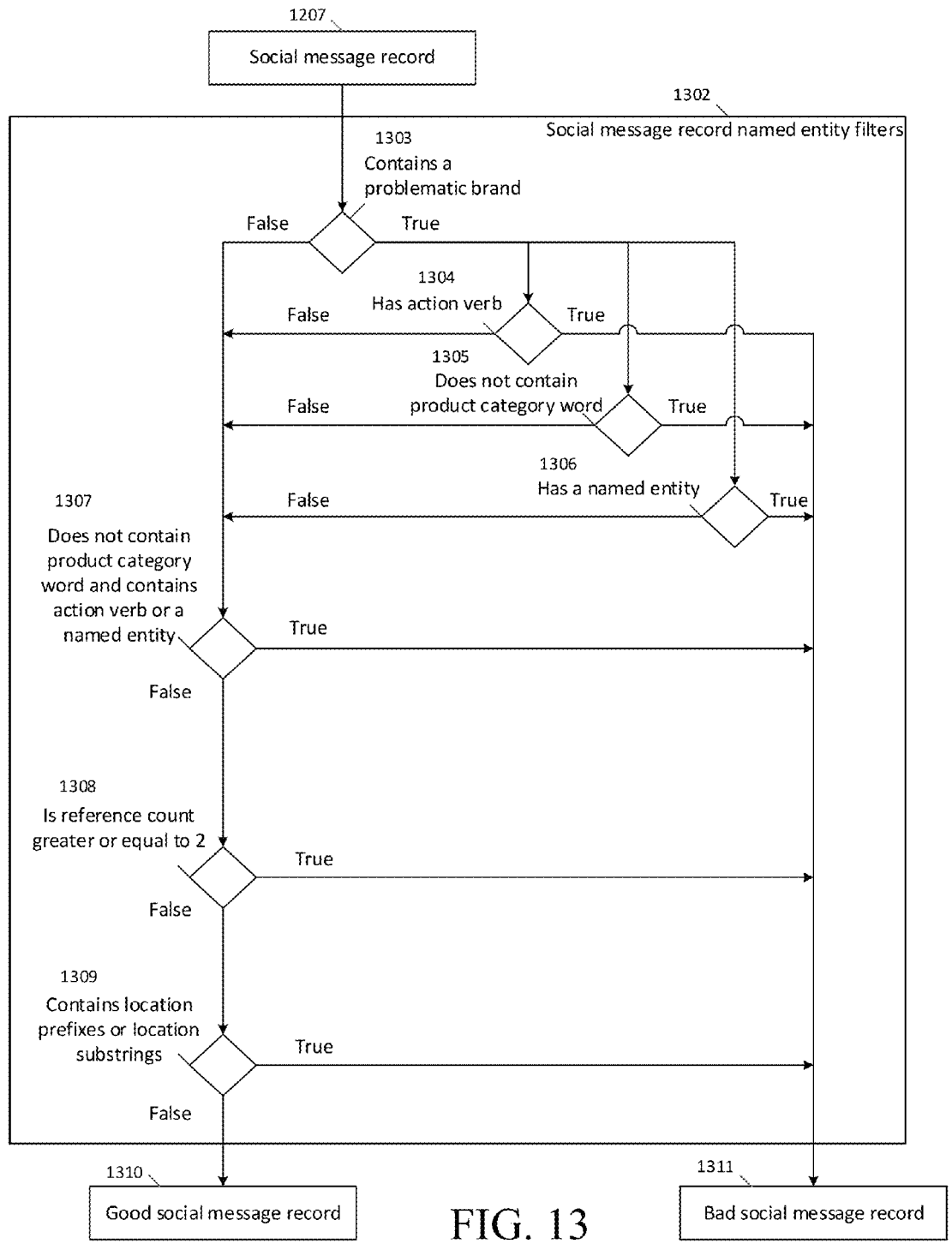
FIG. 13 is a block diagram of the named entity recognition stage.

FIG. 13 represents named entity recognition stage in the fine grained classification pipeline. Now, the social message record also contains social message type properties. Predefined set of rules and predefined set of attributes are used to rule out some social messages 1207 out of classification process. These predefined set of rules and predefined set of attributes constitute the social message record named entity filter 1302. Attributes or checks used here are: does the social message 1207 contains a problematic brand 1303; does it contain action verb 1304; if the social message doesn't have a product category word 1305; does it have a named entity 1306; if it doesn't contain product category word and contains action verb or a named entity 1307; is reference count (reference count refers to @) greater or equal to 2 1308; does it contain location prefixes or location substrings 1309. After passing through the social message record named entity filter 1302 the social message records are divided into good social message records 1310 or bad social message records 1311. Bad social messages 1311 do not go to the next stage, they are filtered out.

The rules for filtering bad social messages are: (1) if the social message does not contain product category and it contains a brand that has been flagged as problematic, it is ruled out; (2) if the social message has a token that is a reference to a person (him, her, mom, dad, etc.) and contains a brand that has been flagged as problematic, it is ruled out; (3) if the social message has a token that is an action verb (call, tell, meet) and contains a brand that has been flagged as problematic, it is ruled out; (4) if the social message does not contain product category and has a token that is either a reference to a person or an action verb, it is ruled out; (5) if the social message has a token that ends with "field", "burg", "ville" or "town" and has brand that has been flagged as problematic, it is ruled out; (6) if the social message has a token that is often a prefix to a location (in, from, over, to, on) and has a brand that has been flagged as problematic, it is ruled out; and (7) if the social message has two, or more than two references to a person (eg. @mark @tom), it is ruled out.

Figure 14:
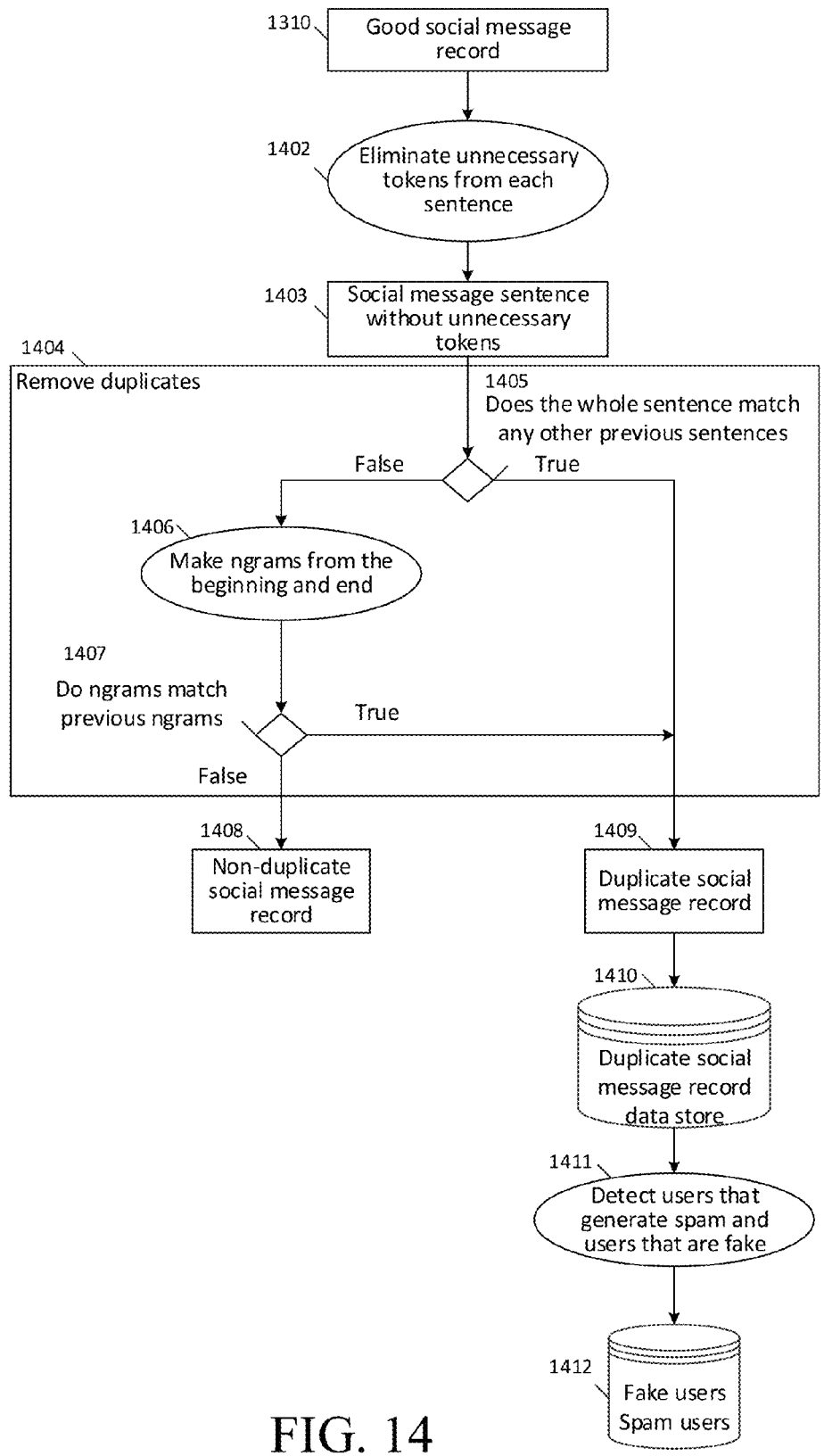
FIG. 14 is a block diagram of the duplicate elimination stage.

FIG. 14 represents duplicate elimination stage. Good social message records 1310 are examined sentence by sentence. Unnecessary tokens are eliminated from each sentence 1402. Unnecessary tokens include hashtags (e.g. #Sony) and symbols (e.g. @John). In the next stage, social message sentences without unnecessary tokens 1403 are passed to the duplicate removal stage 1404. First, the whole sentence is checked to see whether it matches any of the other previous sentences 1405. If this is not the case ngrams are made starting from the beginning of the message and from the end of the sentence 1406. Next, the ngrams are checked to see if they match any of the previously stored ngrams 1407. If no ngram match is detected then the social message record is not a duplicate 1408. This social message record is used in the next stage. If either of the two ngram checks returned a true value, then the social message record is a duplicate 1409. This duplicate social message records 1409 are stored in the duplicate social message record data store 1410. The duplicate social message records in the duplicate social message records data store are used to detect users that generate spam or fake users 1411. Then, this is stored in the fake and spam user data store 1412.

Figure 15:
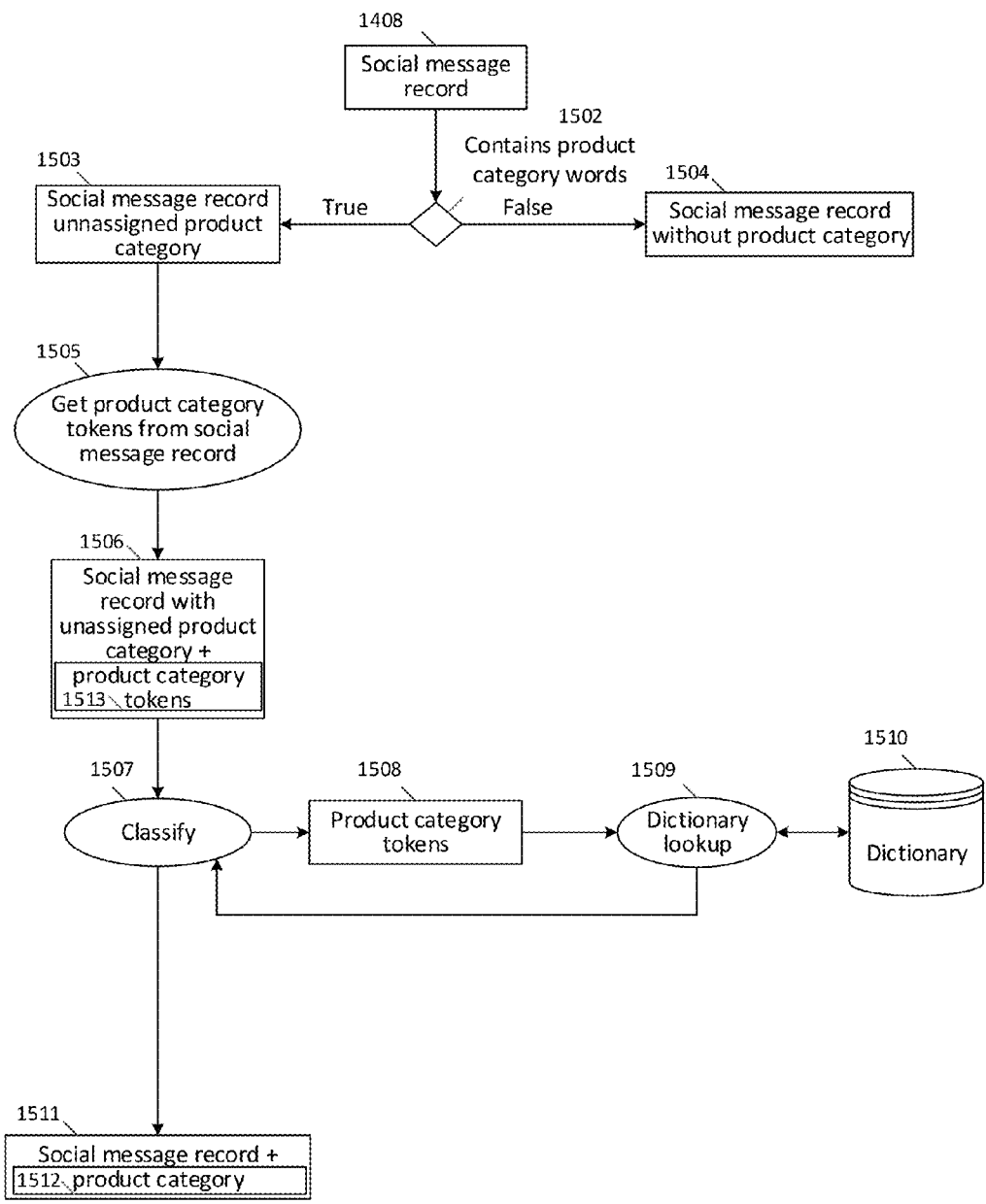
FIG. 15 is a block diagram of the product category determination stage.

FIG. 15 shows the product category determination stage in the fine grained classification pipeline. The non-duplicated social message record 1408 is checked for product category words 1502. If the social message record does not contain any product category words, the social message record is marked as a non-product category record 1504, and is moved to the next stage. If the social message record contains product category words, then the social message record product category 1503 will be identified in the following steps. Next, the product category tokens are extracted from the social message record 1505. Now the social message record with unassigned product category 1506 also has product category tokens 1513. The classification algorithm 1507 uses dictionary lookup 1509 to lookup the tokens 1508 in the product category dictionary 1510. Whether the tokens are a major, minor, other or leaf determines the exact product record category. Next, the social message record 1511 has its product category set 1512.

The base classification and forest construction stage examines the social message sentence by sentence. The goal of this stage is to construct a forest of trees that will later be used to determine final classification(s) of the social message. The root of the tree is always a separator ("and", "but", ",", "&", etc.). If there is no separator token in the sentence, we use the punctuation character that ends the sentence as a separator. If the separator token is present this usually means that there is a different context on both sides of the separator. Each time a separator token is found in the sentence, a new tree is made. Phrase nodes are the only nodes allowed to be connected to separator nodes, as their children. A phrase has many properties. Such as, can it connect one or more manufacturer, or does it have a negation phrase in the social message before or after it. Some of them are taken into consideration at this stage. First, when a phrase token is encountered, a phrase node is made, and is given its base classification, based on the information for that phrase in the dictionary, and sometimes, depending on the other words in the sentence. At this point, we introduce machine learning into the system. Machine learning uses pre labeled data to learn about various scenarios and then use that data to classify the phrase better. Each phrase has its social subcategory, and a social category. A phrase can be positive, negative or neutral. When the phrase has been given its initial classification, it is then connected to the separator node, and with the manufacturer nodes, if there are any. If not, the phrase node is put in a queue, where it waits for a manufacturer node. Depending on its type, the phrase node is allowed to be connected to multiple manufacturers, or just one. Also, depending on its type, a phrase can be connected to a manufacturer, even if they are not in the same forest. Lastly, on the bottom of the tree we have manufacturer nodes.

Manufacturer nodes are made when a manufacturer name token is encountered. The node is then connected to an adjacent phrase. If no phrase has been found yet the manufacturer node is pushed onto a stack, where it waits for a phrase. If no more phrases are found, the manufacturer may then be connected to the last encountered phrase, if the phrase properties allow it. In some cases, negation tokens can be found. Negations change the meaning of the phrase, i.e. change its subcategory/category or the phrase impression. Negations aren't inserted into the tree, they just change the properties of the phrase nodes. When this stage is over, we have a set up forest, ready to be classified.

Figure 16:
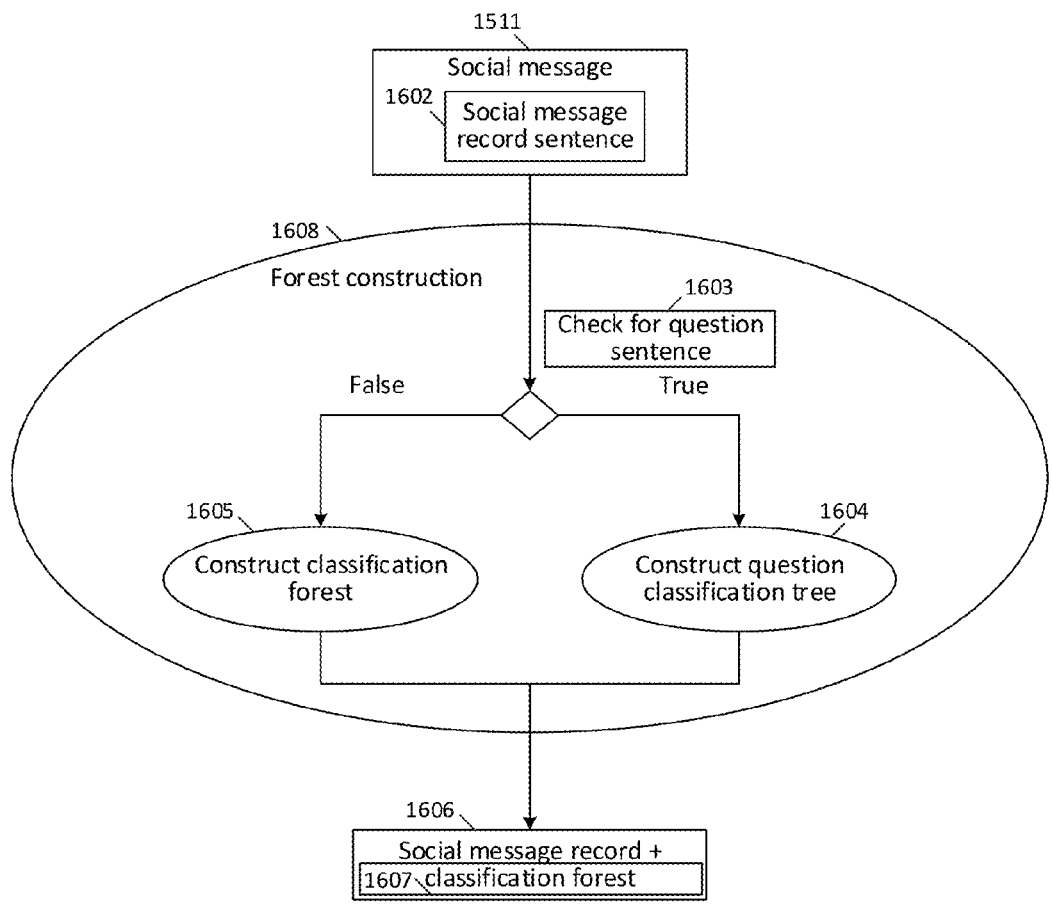
FIG. 16 is a block diagram of the base classification and forest construction stage.

FIG. 16 represents base classification and forest construction stage in an embodiment of the fine grained classification pipeline. Social message record sentences 1602 are taken from the social message record 1511. Each social message record sentence is checked to determine if it is a question sentence 1603. If it is a question sentence, then a question classification tree 1604 is constructed; if it is not a question sentence, then a classification forest 1605 is constructed. When all sentences are checked and their respective classification trees and forest are constructed 1608, then the social message record 1606 has its corresponding classification forest 1607.

Figure 17:
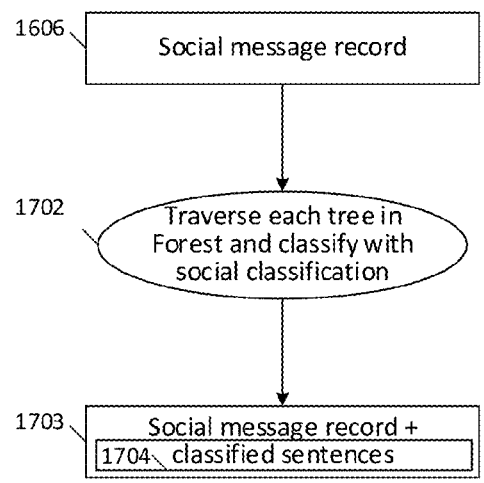
FIG. 17 is a block diagram of the concrete classification stage.

FIG. 17 represents the concrete classification stage in the fine grained classification pipeline. The social message record 1606 is used to collect some information that will facilitate the selection of the classification algorithm for of the given social message. One embodiment will use tree traversal to go through the forest and classify the components of the social message record 1702. There are three different classification algorithms. All three algorithms use dfs or bfs to traverse through the trees. If the sentence type is question type, the question classification algorithm is executed. If the sentence is not of question type, one embodiment starts going through the phrases in the sentence. If a phrase is a comparison phrase, a special classification algorithm is executed. If not, the basic classification algorithm is executed. The question algorithm is based on the fact that all phrases lose meaning when used in sentences that are questions. The comparison classification algorithm uses the position of manufacturer(s) from a phrase, and some phrase properties to determine the impressions. When the classification algorithm is finished, a social message record 1703 results with its classification 1704.

Figure 18:
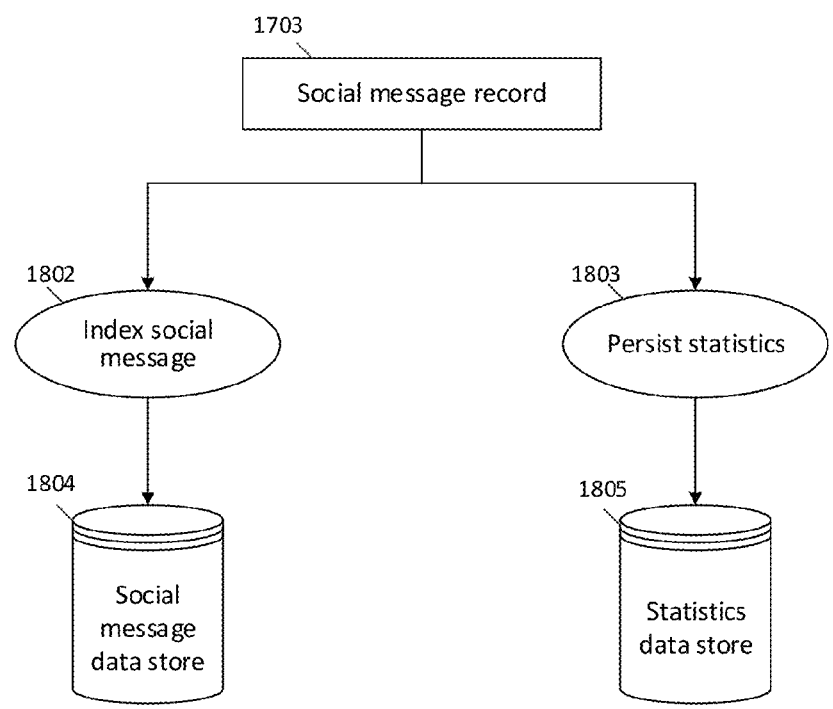
FIG. 18 is a block diagram of the indexing and data store persistence stage.

FIG. 18 represents indexing and data store persistence stage of the fine grained classification pipeline. The social message from the social message record 1801 (1703 from FIG. 17) is taken and its respective classification and index it 1802, and store it to the social message record classification data store 1804. The classifications for brands and products from the social message record are taken and the classification 1803 is persisted to the statistics data store 1805.

Figure 19:
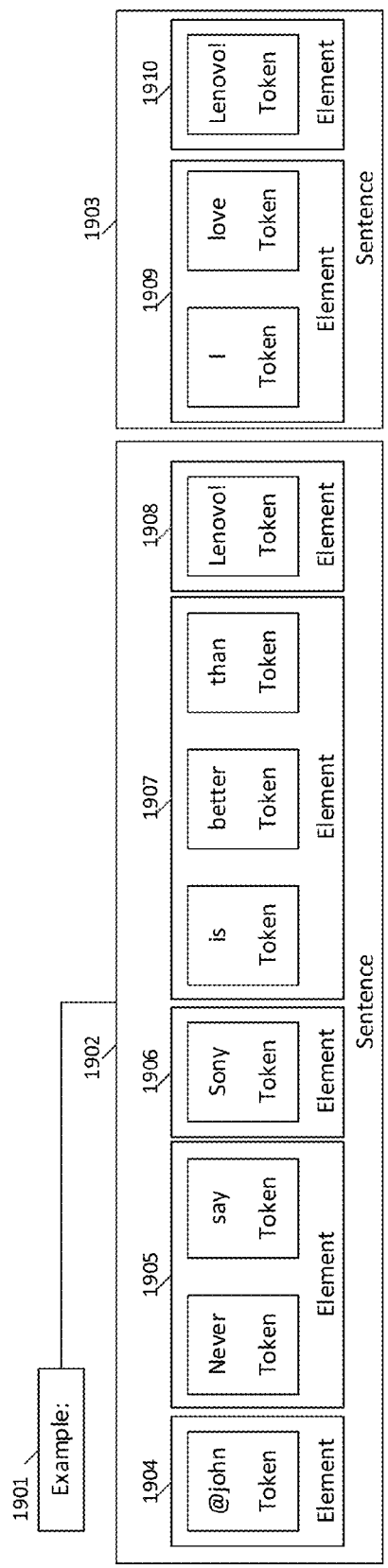
FIG. 19 is an example of the tokenization stage.

FIG. 19 represents an example of the tokenization stage. The social message used here as an example 1901 is: "@John Never say Sony is better than Lenovo! I love Lenovo!" The social message is split into two sentences: "@John Never say Sony is better than Lenovo!" 1902 and "I love Lenovo!" 1903. Each sentence is split into the elements using the dictionary lookup 1107. The elements for the first sentence are: "@John" 1904, "Never say" 1905. "Sony" 1906, "is better than" 1907 and "Lenovo!" 1908. The elements for the second sentence are: "I love" 1909 and "Lenovo" 1910. Each word represents a single token, and each element consists of one or more tokens.

Figure 20:
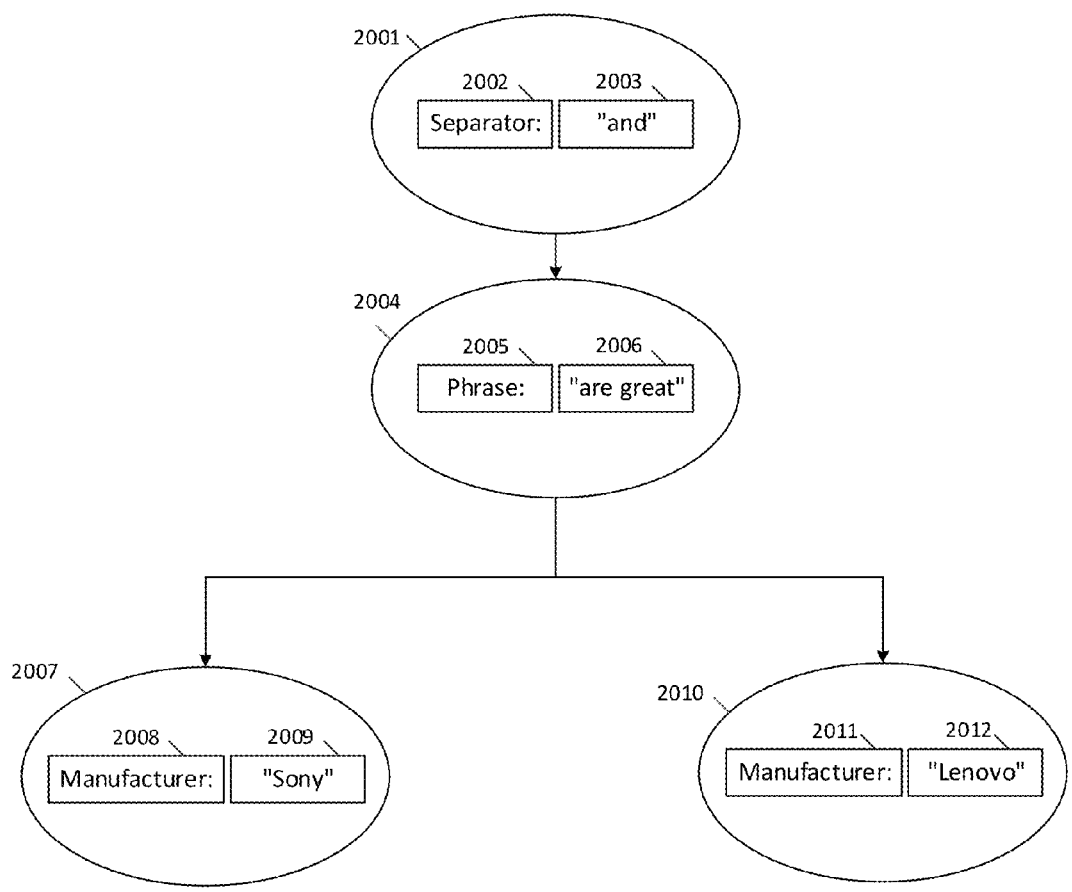
FIG. 20 is an example of the forest construction stage.

FIG. 20 represents an example of the forest construction. For example, with the following social message "Sony and Lenovo are great", an appropriate tree will be constructed. The separator node 2001 will have the value "and" 2003, as a separator 2002; the phrase node 2004 will have the value "are great" 2006, as a phrase 2005 and will be connected to the separator node as its child. Because of the properties of the phrase "are great" 2006 the phrase node can have multiple children. In this case the phrase node will have two children, one manufacturer node 2007 with the value "Sony" 2009, as a manufacturer and one manufacturer node 2010 with the value "Lenovo" 2012, as a manufacturer 2011.

Figure 21:
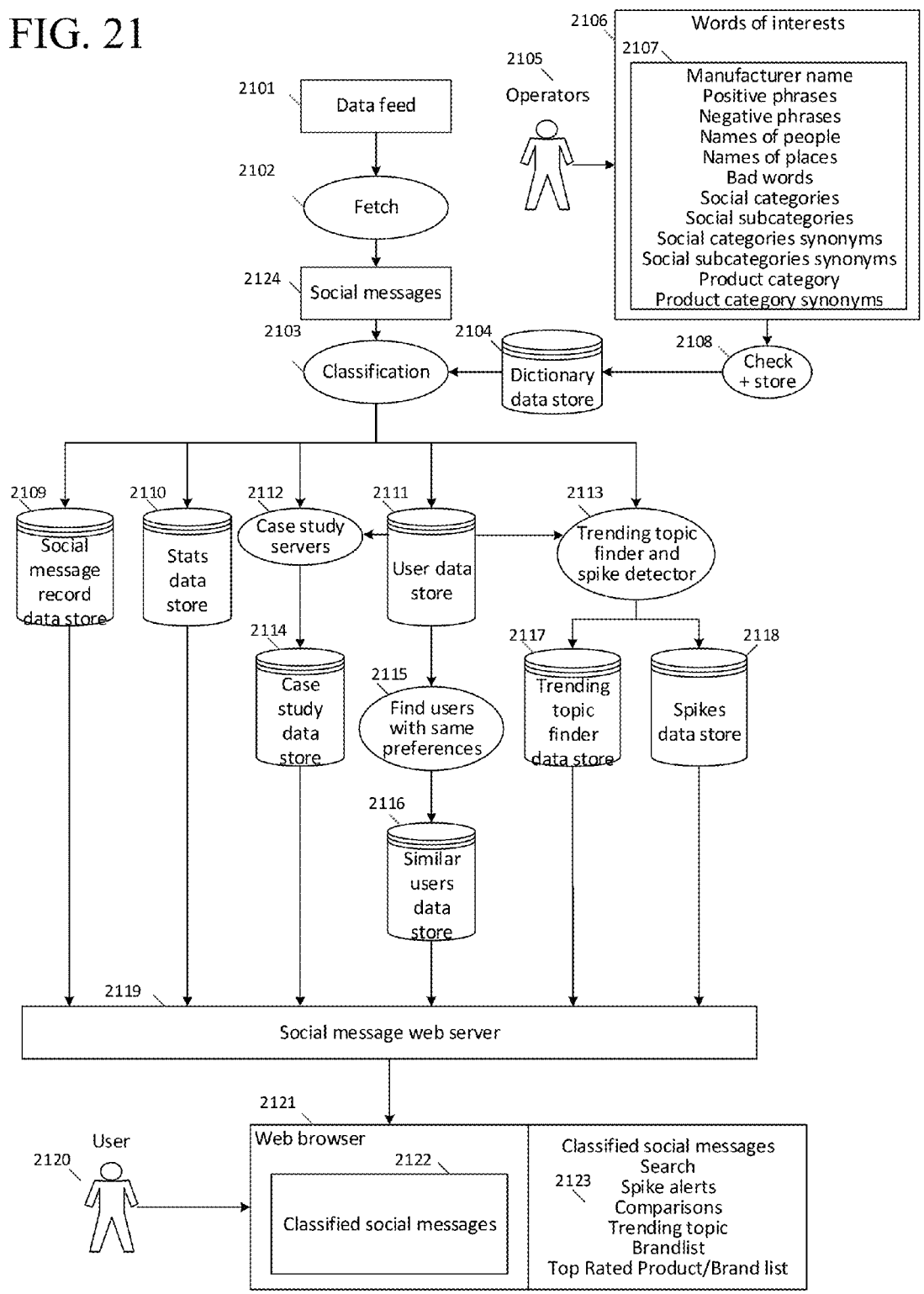
FIG. 21 is a block diagram of the fine grained social message record classification system.

FIG. 21 shows fine grained social message classification system. Social brand messages can come from different sources such as Facebook, Twitter, Google+, Pinterest, and other social networks. These messages are downloaded and crawled by the downloader. After which they are normalized and they create the data feed 2101. Social message records 2124 are fetched 2102 from the data feed, and classified 2103. Classification 2103 uses the dictionary data store 2104 to classify social message records. The dictionary consists of word of interests 2106. Words of interests are manufacturer names, positive phrases, negative phrases, neutral phrases, names of people, names of places, bad words, social categories, social categories synonyms, social subcategories, social subcategories synonyms, product categories and product categories synonyms 2107. Operators 2105 make words of interests and regularly check them. These words of interest are checked and stored 2108 in the dictionary data store 2104.

The classified social message records produce data that is stored into several data stores. Those data stores are: the social message record data store 2109; statistics data store 2110 and user data store 2111. Also, data from the classified social message records goes into the case study servers 2112 and the trending topic finder and spike detector 2113. Case study servers produce data that goes into the case study data store 2114. The trending and topic finder and spike detector 2113 produces the data that goes into two separate data store the trending topic finder data store 2117 and the spike data store 2118. The user data store is used to find users with same preferences 2115 and the data produced there goes into the similar users data store 2116. The social message web server 2119 accesses all of these data stores on the user's 2120 request, and displays classified social messages 2122 and classified social messages, search, brand list, top rated product/brand list, the spike alerts, comparison and trending topic 2123 on the web browser 2121.

It should be further understood that the examples and embodiments pertaining to the systems and methods disclosed herein are not meant to limit the possible implementations of the present technology. Further, although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the Claims.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A computer-implemented method for aggregating structured and social data comprising:
   a) requesting, and in response to the request, receiving, information from one or more social networking servers by a social networking crawler;
   b) extracting one or more records from the received information from one or more product information servers;
   c) splitting social information records into tokens;
   d) looking up a plurality of said tokens in a social rating dictionary;
   e) converting a plurality of social information token synonyms into base words;
   f) assigning semantic types to a plurality of said tokens;
   g) semantically analyzing a plurality of said social information records;
   h) classifying a plurality of said social information records using said plurality of tokens and token types by assigning one or more customer service, product or brand attribute and product categories to a plurality of said social information records;
   i) creating a plurality of sets of said classified social information records by said assigned social categories;
   j) saving said classified social information records in a data store;
   k) accessing a seed queue of URL's for web pages that contain information related to a product on one or more product information servers by a product information crawler;
   l) said product information crawler requesting, and in response to the request, receiving information related to the product from said web pages on one or more product information servers;
   m) extracting one or more product information records from the received information related to the product from the one or more product information servers;
   n) classifying plurality of product information records by tokenizing product information records into product information tokens, looking up plurality of product information tokens in a product category dictionary and converting token synonyms into base words;
   o) saving said classified product information records in a data store;
   p) merging said classified social information records and said classified product information records;
   q) storing said merged classified social information and social product information records in a data store.

2. The method of claim 1 further comprising:
   a) aggregating counts for said classified social information records from a dada store;
   b) receiving a user's request for classified information about social information records containing product, brand or store related information;
   c) retrieving aggregated counts for classified social information records and the classified social information records from a data store; and
   d) displaying aggregated counts for social information records related to a product, brand or store to a user and the classified social information records from a data store.

3. The method of claim 2 wherein the aggregated counts for each social information category for each brand are stored.

4. The method of claim 3 wherein the stored counts for each brand are analyzed to detect a trend for each of the brand's social categories.

5. The method of claim 3 wherein the stored counts for each brand are used to compare different brands and products by social category.

6. The method of claim 3 wherein the stored counts for each product, brand, or store are automatically analyzed periodically to detect sudden upward or downward change or fluctuations in aggregated counts which indicate that an external event has resulted in a significant change in the sentiment or a new sentiment with respect to the product, brand, or store.

7. The method of claim 1 further comprising separating the social information records into sentences and further subdivision of the sentences by separators.

8. The method of claim 7 further comprising creating a hierarchical token group structure from the sentence and further level of hierarchy above the sentence hierarchy.

9. The method of claim 8 further comprising arranging the social information tokens in a data structure organized in a hierarchy by semantic type.

10. The method of claim 9 further comprising associating brand or product tokens with semantic phrases creating semantic groups, creating a hierarchical structure of token groups.

11. The method of claim 10 further comprising individually analyzing the semantic token groups in the hierarchical structure of token groups.

12. The method of claim 9 wherein the social records containing comparisons are further categorized by product categories and social product information attributes and classifications.

13. The method of claim 1 wherein the semantic analysis detects user sentiment on one or more token groups selected from the hierarchical structure of token groups in the social information records, consisting of brand attributes, product features, store and brand policies, service, durability of the product, suitability of the product, longevity of the product, design of the product, comparison of the product or brand to other brands, performance, problem, deal, purchase, question, recommendation, satisfaction, value, wish, design, specification, construction, customer service.

14. The method of claim 13 further comprising augmenting the social information record with the analyzed information about attributes and categories and displaying the augmented social information record in a web browser.

15. The method of claim 13 wherein the semantic analysis detects social information records which contain comparisons between two or more brands or products.

16. The method of claim 15 wherein the social information comparison records categorized by product categories and social product information attributes and classifications are displayed for the user in a graph, histogram, or column layout.

17. The method of claim 15 wherein the categorized social product information comparison records are sorted into an ordered list by the aggregated counts and analysis.

18. The method of claim 13 wherein the significant change of sentiment in one or more social classification categories for a product is detected at a later time and an alert is sent to a user.

19. The method of claim 1 further comprising returning the merged and augmented social information records to a user for display.

20. The method of claim 1 further comprising classifying the social information records by social and product categories which can be viewed in a hierarchical web view.

21. The method of claim 1 wherein the product information record comprises a product name field, a breadcrumb field, a title field, a URL field and product data fields.

22. A non-transitory computer readable medium for storing computer implementable instructions in non-volatile memory, said instructions for causing a structured and social data aggregator to perform a method of aggregating structured and social data, said method comprising:
   a) requesting, and in response to the request, receiving, information front one or more social networking servers by a social networking crawler;
   b) extracting one or more records from fee received information from one or more product information servers;
   c) splitting social information records into tokens;
   d) looking up a plurality of said tokens in a social rating dictionary;
   e) converting a plurality of social information token synonyms into base words;
   f) assigning semantic types to the plurality of said tokens;
   g) semantically analyzing a plurality of said social information records;
   h) classifying a plurality of said social information records using said plurality of tokens and a token types by assigning one or more customer service, product or brand attribute and product categories to a plurality of said social information records;
   i) creating a plurality of sets of said classified social information records by said assigned social categories;
   j) saving said classified social information records in a data store;
   k) accessing a seed queue of URL's for web pages that contain information related to a product on one or more product information servers by a product information crawler;
   l) said product information crawler requesting, and in response to the request, receiving information related to the product from said web pages on one or more product information servers;
   m) extracting one or more product information records from the received information related to the product from the one or more product information servers;
   n) classifying plurality of product information records by tokenizing product information records into product information tokens, looking up plurality of product information tokens in a product category dictionary and converting token synonyms into base words;
   o) saving said classified product information records in a data store;
   p) merging said classified social information records and said classified product information records;
   q) storing said merged classified social information and social product information records in a data store.

23. The computer readable medium of claim 22 wherein said instructions cause said structured and social data aggregator to perform said method further comprising: semantically analyzing the social information records, and classifying the individual attributes in the social information records based on the analysis, creating a set of social information token categories associated with each of the social information records based on the classification.

24. The computer readable medium of claim 23 wherein said instructions cause said structured and social data aggregator to perform said method further wherein: the semantic analysis detects user opinion on one or more of the following attributes and social information: product features, store and brand policies, service, durability of the product, suitability of the product, longevity of the product, design of the product creating a set of social information token categories associated with each of the social information records based on the classification.

25. A system for aggregating structured and social data comprising:
   a) processor and memory configured to execute software instructions;
   b) a product information crawler server configured to request, and in response to the request, receive, information front one or more social networking servers by a social networking crawler;
   c) a structured data extractor configured to extract one or more records from fee received information from one or more product information servers;
   d) social information tokenizer configured to split social information records into tokens;

e) social information tokenizer configured look UP a plurality of said tokens in a social rating dictionary;
f) a product classifier configured to convert a plurality of social information token synonyms into base words;
g) a product classifier configured to assign semantic types to the plurality of said tokens;
h) a social rating analyzer configured to semantically analyze a plurality of said social information records;
i) social information classifier configured to classify a plurality of said social information records using said plurality of tokens and a token types by assigning one or more customer service, product or brand attribute and product categories to a plurality of said social information records;
j) a product classifier configured to create a plurality of sets of said classified social information records by said assigned social categories;
k) a data store configured to save said classified social information records;
l) a social networking crawler configured to access a seed queue of URL's for web pages that contain information related to a product on one or more product information servers by a product information crawler;
m) a social networking crawler configured to crawl for each product, store, or brand request and in response to the request, receive information related to the product, store or brand from one or more social networking servers;
n) a social rating analyzer configured to extract one or more product information records from the received information related to the product from the one or more product information servers;
o) social information classifier configured to classify plurality of product information records by tokenizing product information records into product information tokens, look up plurality of product information tokens in a product category dictionary and convert token synonyms into base words;
p) a data store configured to save said classified product information records;
q) an information aggregator configured to merge said classified social information records and said classified product information records;
r) a data store configured to store said merged classified social information and social product information records.

26. The system of claim 25 further comprising a social classifier configured to classify social information records.

27. The system of claim 26 further comprising a social rating dictionary comprising a collection of words wherein the social classifier is configured to query the social rating dictionary to detect the meaning of one or more phrases composed of tokens in the social information record.

28. The system of claim 25 wherein the social information server is standalone computer system configured to send and receive data from a network and process social information servers.

29. The system of claim 25 wherein based on the users set of social information store, brand, and product classifications and sentiments associated with stores, products and brands, or similar products and brands and stores, products and brands can be looked up in the aggregated social product classification information store and advertisements or affiliate links can be communicated to the user.

* * * * *